(12) United States Patent
Rabinowitz et al.

(10) Patent No.: US 6,861,984 B2
(45) Date of Patent: *Mar. 1, 2005

(54) POSITION LOCATION USING BROADCAST DIGITAL TELEVISION SIGNALS

(75) Inventors: Matthew Rabinowitz, Portola Valley, CA (US); James J. Spilker, Jr., Woodside, CA (US)

(73) Assignee: Rosum Corporation, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/210,847

(22) Filed: Jul. 31, 2002

(65) Prior Publication Data

US 2003/0052822 A1 Mar. 20, 2003

Related U.S. Application Data

(63) Continuation of application No. 09/887,158, filed on Jun. 21, 2001, now abandoned.
(60) Provisional application No. 60/265,675, filed on Feb. 2, 2001, provisional application No. 60/281,270, filed on Apr. 3, 2001, provisional application No. 60/281,269, filed on Apr. 3, 2001, provisional application No. 60/293,812, filed on May 25, 2001, provisional application No. 60/293,813, filed on May 25, 2001, provisional application No. 60/293,646, filed on May 25, 2001, provisional application No. 60/309,267, filed on Jul. 31, 2001, and provisional application No. 60/344,988, filed on Dec. 20, 2001.

(51) Int. Cl.[7] .............................................. G01S 3/02

(52) U.S. Cl. ..................................................... 342/464

(58) Field of Search ....................... 342/357.01, 357.06, 342/453, 463, 464

(56) References Cited

U.S. PATENT DOCUMENTS

| 4,555,707 A | 11/1985 | Connelly |
| 4,652,884 A | 3/1987 | Starker |

(List continued on next page.)

FOREIGN PATENT DOCUMENTS

| GB | 2 222 922 A | 3/1990 |
| GB | 2 254 508 A | 10/1992 |

OTHER PUBLICATIONS

Parkinson, B.W., et al., "Autonomous GPS Integrity Monitoring Using the Pseudorange Residual," *Journal of the Institute of Navigation* (1988), vol. 35, No. 2, pp. 255–274.

Rabinowitz, M., "A Differential Carrier Phase Navigation System Combining GPS with Low Earth Orbit Satellites for Rapid Resolution of Integer Cycle Ambiguities," *PhD Thesis for Department of Electrical Engineering, Stanford University* (Dec. 2000), pp. 59–73.

Spilker, Jr., J.J., "Fundamentals of Signal Tracking Theory," *Global Positioning System: Theory and Applications* (1994), vol. 1, Chapter 7, pp. 245–327.

(List continued on next page.)

*Primary Examiner*—Dao Phan
(74) *Attorney, Agent, or Firm*—Richard A. Dunning, Jr.

(57) ABSTRACT

A computer program product, apparatus, and method for determining the position of a user terminal. It includes receiving at the user terminal a plurality of digital television (DTV) broadcast signals from a plurality of DTV transmitters, determining a pseudo-range between the user terminal and each DTV transmitter based on the DTV broadcast signals, and determining a position of the user terminal based on the pseudo-ranges and a location of each of the DTV transmitters.

114 Claims, 17 Drawing Sheets

U.S. PATENT DOCUMENTS

| | | | |
|---|---|---|---|
| 4,894,662 | A | 1/1990 | Counselman |
| 5,045,861 | A | 9/1991 | Duffett-Smith |
| 5,157,686 | A | 10/1992 | Omura et al. |
| 5,166,952 | A | 11/1992 | Omura et al. |
| 5,323,322 | A | 6/1994 | Mueller et al. |
| 5,398,034 | A | 3/1995 | Spilker, Jr. |
| 5,481,316 | A | 1/1996 | Patel |
| 5,504,492 | A | 4/1996 | Class et al. |
| 5,510,801 | A | 4/1996 | Engelbrecht et al. |
| 5,774,829 | A | 6/1998 | Cisneros et al. |
| 5,920,284 | A | 7/1999 | Victor |
| 5,952,958 | A | 9/1999 | Speasl et al. |
| 5,953,311 | A | 9/1999 | Davies et al. |
| 6,078,284 | A | 6/2000 | Levanon |
| 6,094,168 | A | 7/2000 | Duffett-Smith et al. |
| 6,107,959 | A | 8/2000 | Levanon |
| 6,137,441 | A | 10/2000 | Dai et al. |
| 6,317,500 | B1 | 11/2001 | Murphy |
| 6,373,432 | B1 | 4/2002 | Rabinowitz et al. |
| 6,374,177 | B1 | 4/2002 | Lee et al. |
| 6,433,740 | B1 | 8/2002 | Gilhousen |
| 2003/0122711 | A1 | 7/2003 | Panasik et al. |

OTHER PUBLICATIONS

Van Dierendock, A.J., "GPS Receivers," *Global Positioning System: Theory and Applications* (1995), vol. 1, Chapter 8, pp. 329–407.

Li, X., et al., "Indoor Geolocation Using OFDM Signals in HIPERLAN/2 Wireless LANS," 11$^{th}$ IEEE International Symposium on Personal Indoor and Mobile Radio Communications, PIMRC 2000, Proceedings (Cat. No. 00TH8525), Proceedings of 11$^{th}$ International Symposium on Personal Indoor and Mobile Radio Communication, London, UK, Sep. 18–21, pp. 1449–1453, vol. 2, XPO10520871, 2000, Piscataway, NJ, USA, IEEE, USA, ISBN; 9–7803–6463–5, Chapter I and III.

Rabinowitz, M., et al., "Positioning Using the ATSC Digital Television Signal," Rosum whitepaper, Online! 2001, XP002235053, Retrieved from the Internet on 03–13–2003 at URL www.rosum.com/whitepaper 8–7–01.pdf.

EP Abstract/Zusammenfassung/Abrege, 02102666.1.

JP Abstract/vol. 007, No. 241 (P–232), Oct. 26, 1983 & JP58 129277 A (Nihon Musen. KK) Aug. 02, 1983.

| 4 | 511 Symbols | 63 | 63 | 63 | 128 |

FIG. 9

| 4 | 828 Symbols |

FIG. 10

POSITION LOCATION USING BROADCAST DIGITAL TELEVISION SIGNALS

CROSS-REFERENCE TO RELATED APPLICATIONS

This application is a continuation of U.S. Non-provisional patent application Ser. No. 09/887,158, "Position Location using Broadcast Digital Television Signals," by Matthew Rabinowitz and James J. Spilker, filed Jun. 21, 2001, now abandoned the disclosure thereof incorporated by reference herein in its entirety.

This application claims the benefit of U.S. Provisional Patent Applications Ser. No. 60/265,675, "System and Method for Navigation and/or Data Communication Using Satellite and/or Terrestrial Infrastructure," by Matthew Rabinowitz and James J. Spilker, filed Feb. 2, 2001; Ser. No. 60/281,270, "Use of the ETSJ DVB Terrestrial Digital TV Broadcast Signals For High Accuracy Position Location in Mobile Radio Links," by James J. Spilker, filed Apr. 3, 2001; Ser. No. 60/281,269, "An ATSC Standard DTV Channel For Low Data Rate Broadcast to Mobile Receivers," by James J. Spilker and Matthew Rabinowitz, filed Apr. 3, 2001; Ser. No. 60/293,812, "DTV Monitor System Unit (MSU)," by James J. Spilker and Matthew Rabinowitz, filed May 25, 2001; Serial No. 60/293,813, "DTV Position Location Range And SNR Performance," by James J. Spilker and Matthew Rabinowitz, filed May 25, 2001; Serial No. 60/293,646, "Time-Gated Noncoherent Delay Lock Loop Tracking Of DTV Signals," by James J. Spilker and Matthew Rabinowitz, filed May 25, 2001; Ser. No. 60/309,267, "Methodology and System for Tracking the Digital Television Signal with Application to Positioning Wireless Devices," by James Omura, James J. Spilker Jr., and Matthew Rabinowitz, filed Jul. 31, 2001; and Ser. No. 60/344,988, "Advanced Position Location Technique using Television Transmissions from Synchronized Transmitters," by James J. Spilker Jr., filed Dec. 20, 2001. The subject matter of all of the foregoing are incorporated by reference herein in their entirety.

BACKGROUND

The present invention relates generally to position determination, and particularly to position determination using DTV signals.

There have long been methods of two-dimensional latitude/longitude position location systems using radio signals. In wide usage have been terrestrial systems such as Loran C and Omega, and a satellite-based system known as Transit. Another satellite-based system enjoying increased popularity is the Global Positioning System (GPS).

Initially devised in 1974, GPS is widely used for position location, navigation, survey, and time transfer. The GPS system is based on a constellation of 24 on-orbit satellites in sub-synchronous 12 hour orbits. Each satellite carries a precision clock and transmits a pseudo-noise signal, which can be precisely tracked to determine pseudo-range. By tracking 4 or more satellites, one can determine precise position in three dimensions in real time, world-wide. More details are provided in B. W. Parkinson and J. J. Spilker, Jr., Global Positioning System-Theory and Applications, Volumes I and II, AIAA, Washington, D.C. 1996.

GPS has revolutionized the technology of navigation and position location. However in some situations, GPS is less effective. Because the GPS signals are transmitted at relatively low power levels (less than 100 watts) and over great distances, the received signal strength is relatively weak (on the order of −160 dBw as received by an omni-directional antenna). Thus the signal is marginally useful or not useful at all in the presence of blockage or inside a building.

There has even been a proposed system using conventional analog National Television System Committee (NTSC) television signals to determine position. This proposal is found in a U.S. patent entitled "Location Determination System And Method Using Television Broadcast Signals," U.S. Pat. No. 5,510,801, issued Apr. 23, 1996. However, the present analog TV signal contains horizontal and vertical synchronization pulses intended for relatively crude synchronization of the TV set sweep circuitry. Further, in 2006 the Federal Communication Commission (FCC) will consider turning off NTSC transmitters and reassigning that valuable spectrum so that it can be auctioned for other purposes deemed more valuable.

SUMMARY

In general, in one aspect, the invention features a computer program product, apparatus, and method for determining the position of a user terminal. It includes receiving at the user terminal a plurality of digital television (DTV) broadcast signals from a plurality of DTV transmitters, determining a pseudo-range between the user terminal and each DTV transmitter based on the DTV broadcast signals, and determining a position of the user terminal based on the pseudo-ranges and a location of each of the DTV transmitters.

Particular implementations can include one or more of the following features. Determining a position of the user terminal includes adjusting the pseudo-ranges based on a difference between a transmitter clock at one of the DTV transmitters and a known time reference. The DTV broadcast signal is an American Television Standards Committee (ATSC) DTV signal, and the pseudo-ranges are determined based on a known digital sequence in the ATSC frame. The known digital sequence is a synchronization code. The synchronization code is a Field Synchronization Segment within an ATSC data frame. The synchronization code is a Synchronization Segment within a Data Segment within an ATSC data frame. Determining a position of the user terminal includes determining an offset between a local time reference in the user terminal and a master time reference. Implementations include determining a subsequent position of the user terminal using the offset. Determining a pseudo-range includes storing a portion of each of the DTV signals; and subsequently correlating each of the stored portions and a signal generated by the user terminal to produce the pseudo-ranges. Determining a pseudo-range includes correlating each of the DTV signals with a signal generated by the user terminal as the DTV signals are received to produce the pseudo-ranges. Determining a position of the user terminal includes determining a general geographic area within which the user terminal is located; and determining the position of the user terminal based on the pseudo-ranges and the geographic area. The geographic area is a footprint of an additional transmitter communicably linked to the user terminal. Determining a position of the user terminal includes determining a tropospheric propagation velocity in the vicinity of the user terminal; and adjusting the value of each pseudo-range based on the tropospheric propagation velocity. Determining a position of the user terminal includes adjusting each pseudo-range based on the terrain elevation in the vicinity of the user terminal. Implementations include selecting the DTV signals based on an identity of an additional transmitter communicably linked to the user terminal and a stored table correlating the additional transmitter and the received DTV broadcast signals. Implementations include accepting a location input from a user; and selecting the DTV signals based on the location input. Implementations include scanning available DTV signals to assemble a fingerprint of the location; and selecting the DTV broadcast signals used to determine the pseudo-ranges based on the fingerprint and a stored table that matches known fingerprints with known locations. Implementations include using receiver autonomous integrity monitoring (RAIM) to check the integrity of each pseudo-range based on redundant pseudo-ranges from the DTV transmitters Advantages that can be seen in implementations of the invention include one or more of the following. Implementations of the invention may be used to position cellular telephones, wireless PDA's (personal digital assistant), pagers, cars, OCDMA (orthogonal code-division multiple access) transmitters and a host of other devices. Implementations of the inventions make use of a DTV signal which has excellent coverage over the United States, and the existence of which is mandated by the Federal Communication Commission. Implementations of the present invention require no changes to the Digital Broadcast Stations.

The DTV signal has a power advantage over GPS of more than 40 dB, and substantially superior geometry to that which a satellite system could provide, thereby permitting position location even in the presence of blockage and indoors. The DTV signal has roughly six times the bandwidth of GPS, thereby minimizing the effects of multipath. Due to the high power and low duty factor of the DTV signal used for ranging, the processing requirements are minimal. Implementations of the present invention accommodate far cheaper, lower-speed, and lower-power devices than a GPS technique would require.

In contrast to satellite systems such as GPS, the range between the DTV transmitters and the user terminals changes very slowly. Therefore the DTV signal is not significantly affected by Doppler effects. This permits the signal to be integrated for a long period of time, resulting in very efficient signal acquisition.

The frequency of the DTV signal is substantially lower that that of conventional cellular telephone systems, and so has better propagation characteristics. For example, the DTV signal experiences greater diffraction than cellular signals, and so is less affected by hills and has a larger horizon. Also, the signal has better propagations characteristics through buildings and automobiles.

Unlike the terrestrial Angle-of-Arrival/Time-of-Arrival positioning systems for cellular telephones, implementations of the present invention require no change to the hardware of the cellular base station, and can achieve positioning accuracies on the order of 1 meter. When used to position cellular phones, the technique is independent of the air interface, whether GSM (global system mobile), AMPS (advanced mobile phone service), TDMA (time-division multiple access), CDMA, or the like. A wide range of UHF (ultra-high frequency) frequencies has been allocated to DTV transmitters. Consequently, there is redundancy built into the system that protects against deep fades on particular frequencies due to absorption, multipath and other attenuating effects.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 9 illustrates the structure of the field synchronization segment of the ATSC frame.

FIG. 10 illustrates the structure of the data segment of the ATSC frame.

Like reference symbols in the various drawings indicate like elements.

DETAILED DESCRIPTION

Introduction

Figure 1:
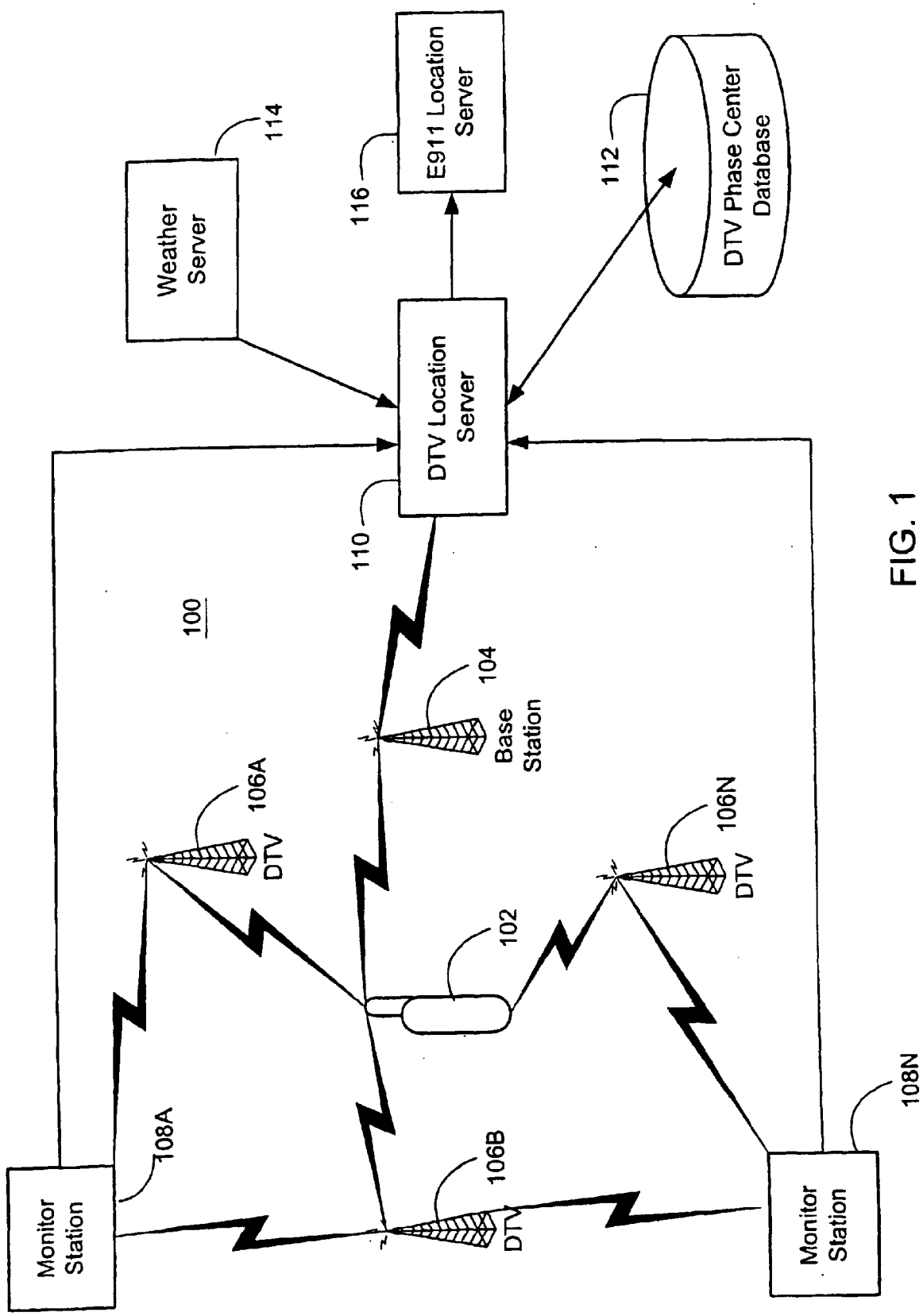
FIG. 1 depicts an implementation of the present invention including a user terminal that communicates over an air link with a base station.

Digital television (DTV) is growing in popularity. DTV was first implemented in the United States in 1998. As of the end of 2000, 167 stations were on the air broadcasting the DTV signal. As of Feb. 28, 2001, approximately 1200 DTV construction permits had been acted on by the FCC. According to the FCC's objective, all television transmission will soon be digital, and analog signals will be eliminated. Public broadcasting stations must be digital by May 1, 2002 in order to retain their licenses. Private stations must be digital by May 1, 2003. Over 1600 DTV transmitters are expected in the United States.

These new DTV signals permit multiple standard definition TV signals or even high definition signals to be transmitted in the assigned 6 MHz channel. These new American Television Standards Committee (ATSC) DTV signals are completely different from the analog NTSC TV signals, are transmitted on new 6 MHz frequency channels, and have completely new capabilities.

The inventors have recognized that the ATSC signal can be used for position location, and have developed techniques for doing so. These techniques are usable in the vicinity of ATSC DTV transmitters with a range from the transmitter much wider than the typical DTV reception range. Because of the high power of the DTV signals, these techniques can even be used indoors by handheld receivers, and thus provide a possible solution to the position location needs of the Enhanced 911 (E911) system.

The techniques disclosed herein are also applicable to DTV signals as defined by the Digital Video Broadcasting (DVB) standard recently adopted by the European Telecommunications Standards Institute (ETSI). For example, the techniques described herein can be used with the scattered pilot carrier signals embedded within the DVB signal. The DVB scattered pilot carrier signals are a set of 868 uniformly-spaced pilot carrier signals, each of which is frequency hopped in a chirp-like fashion over four sequentially-increasing frequencies. These techniques are also applicable to DTV signals as defined by the Japanese Integrated Service Digital Broadcasting-Terrestrial (ISDB-T). These techniques are also applicable to other DTV signals, including those which transmit a known sequence of data.

In contrast to the digital pseudo-noise codes of GPS, the DTV signals are received from transmitters only a few miles distant, and the transmitters broadcast signals at levels up to the megawatt level. In addition the DTV antennas have significant antenna gain, on the order of 14 dB. Thus there is often sufficient power to permit DTV signal reception inside buildings.

Certain implementations of the present invention use only the DTV signal synchronization codes as opposed to demodulating and decoding the DTV 8-ary Vestigial Sideband Modulation (8VSB) data signal. Consequently, the DTV signal can be correlated for a period roughly a million times longer than the period of single data symbol. Thus the ability to track signals indoors at substantial range from the DTV tower is greatly expanded. Furthermore, through the use of digital signal processing it is possible to implement these new tracking techniques in a single semiconductor chip.

Referring to FIG. 1, an example implementation 100 includes a user terminal 102 that communicates over an air link with a base station 104. In one implementation, user terminal 102 is a wireless telephone and base station 104 is a wireless telephone base station. In one implementation, base station 104 is part of a mobile MAN (metropolitan area network) or WAN (wide area network).

FIG. 1 is used to illustrate various aspects of the invention but the invention is not limited to this implementation. For example, the phrase "user termiinal" is meant to refer to any object capable of implementing the DTV position location described. Examples of user terminals include PDAs, mobile phones, cars and other vehicles, and any object which could include a chip or software implementing DTV position location. It is not intended to be limited to objects which are "terminals" or which are operated by "users."

Position Location Performed by a DTV Location Server

Figure 2:
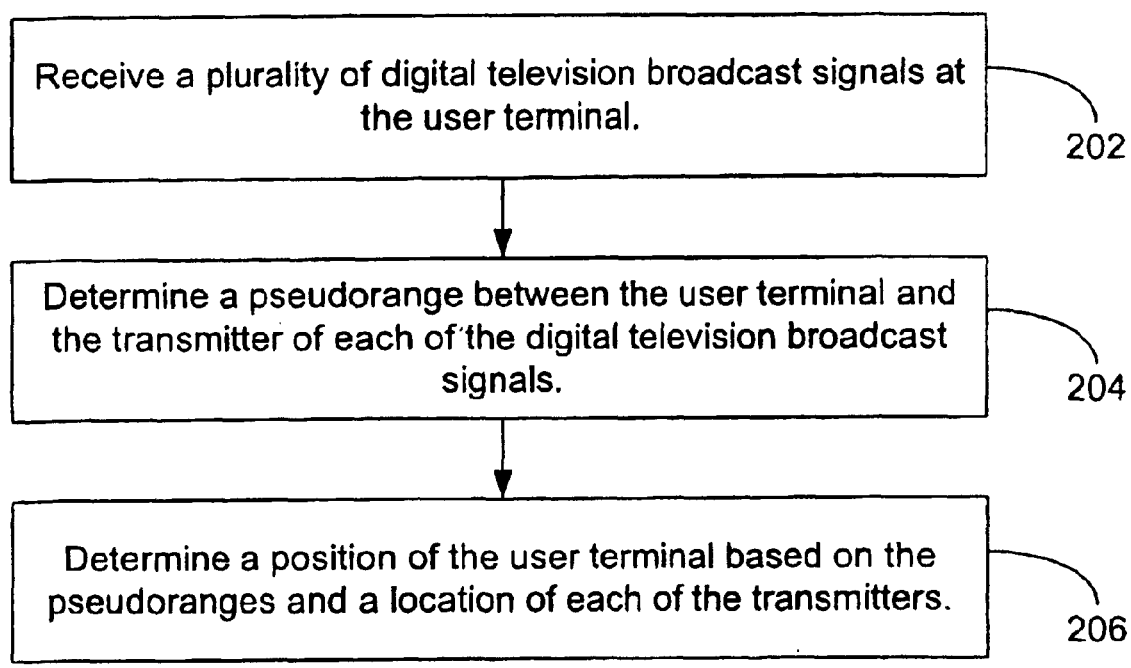
FIG. 2 illustrates an operation of an implementation of the invention.

FIG. 2 illustrates an operation of implementation 100. User terminal 102 receives DTV signals from a plurality of DTV transmitters 106A and 106B through 106N (step 202).

Various methods can be used to select which DTV channels to use in position location. In one implementation, a DTV location server 110 tells user terminal 102 of the best DTV channels to monitor. In one implementation, user terminal 102 exchanges messages with DTV location server 110 by way of base station 104. In one implementation user terminal 102 selects DTV channels to monitor based on the identity of base station 104 and a stored table correlating base stations and DTV channels. In another implementation, user terminal 102 can accept a location input from the user that gives a general indication of the area, such as the name of the nearest city; and uses this information to select DTV channels for processing. In one implementation, user terminal 102 scans available DTV channels to assemble a fingerprint of the location based on power levels of the available DTV channels. User terminal 102 compares this fingerprint to a stored table that matches known fingerprints with known locations to select DTV channels for processing.

User terminal 102 determines a pseudo-range between the user terminal 102 and each DTV transmitter 106 (step 204). Each pseudo-range represents the time difference (or equivalent distance) between a time of transmission from a transmitter 108 of a component of the DTV broadcast signal and a time of reception at the user terminal 102 of the component, as well as a clock offset at the user terminal.

User terminal 102 transmits the pseudo-ranges to DTV location server 110. In one implementation, DTV location server 110 is implemented as a general-purpose computer executing software designed to perform the operations described herein. In another implementation, DTV location server is implemented as an ASIC (application-specific integrated circuit). In one implementation, DTV location server 110 is implemented within or near base station 104.

The DTV signals are also received by a plurality of monitor units 108A through 108N. Each monitor unit can be implemented as a small unit including a transceiver and processor, and can be mounted in a convenient location such as a utility pole, DTV transmitters 106, or base stations 104. In one implementation, monitor units are implemented on satellites.

Each monitor unit 108 measures, for each of the DTV transmitters 106 from which it receives DTV signals, a time offset between the local clock of that DTV transmitter and a reference clock. In one implementation the reference clock is derived from GPS signals. The use of a reference clock permits the determination of the time offset for each DTV transmitter 106 when multiple monitor units 108 are used, since each monitor unit 108 can determine the time offset with respect to the reference clock. Thus, offsets in the local clocks of the monitor units 108 do not affect these determinations.

In another implementation, no external time reference is needed. According to this implementation, a single monitor unit receives DTV signals from all of the same DTV transmitters as does user terminal 102. In effect, the local clock of the single monitor unit functions as the time reference.

In one implementation, each time offset is modeled as a fixed offset. In another implementation each time offset is modeled as a second order polynomial fit of the form $$\text{Offset} = a + b(t-T) + c(t-T)^2 \quad (1)$$

that can be described by a, b, c, and T. In either implementation, each measured time offset is transmitted periodically to the DTV location server using the Internet, a secured modem connection or the like. In one implementation, the location of each monitor unit 108 is determined using GPS receivers.

DTV location server 110 receives information describing the phase center (i.e., the location) of each DTV transmitter 106 from a database 112. In one implementation, the phase center of each DTV transmitter 106 is measured by using monitor units 108 at different locations to measure the phase center directly. In another implementation, the phase center of each DTV transmitter 106 is measured by surveying the antenna phase center.

In one implementation, DTV location server 110 receives weather information describing the air temperature, atmospheric pressure, and humidity in the vicinity of user terminal 102 from a weather server 114. The weather information is available from the Internet and other sources such as NOAA. DTV location server 110 determines tropospheric propagation velocity from the weather information using techniques such as those disclosed in B. Parkinson and J. Spilker, Jr. Global Positioning System-Theory and Applications, AIAA, Washington, D.C., 1996, Vol. 1, Chapter 17 Tropospheric Effects on GPS by J. Spilker, Jr.

DTV location server 110 can also receive from base station 104 information which identifies a general geographic location of user terminal 102. For example, the information can identify a cell or cell sector within which a cellular telephone is located. This information is used for ambiguity resolution, as described below.

Figure 3:
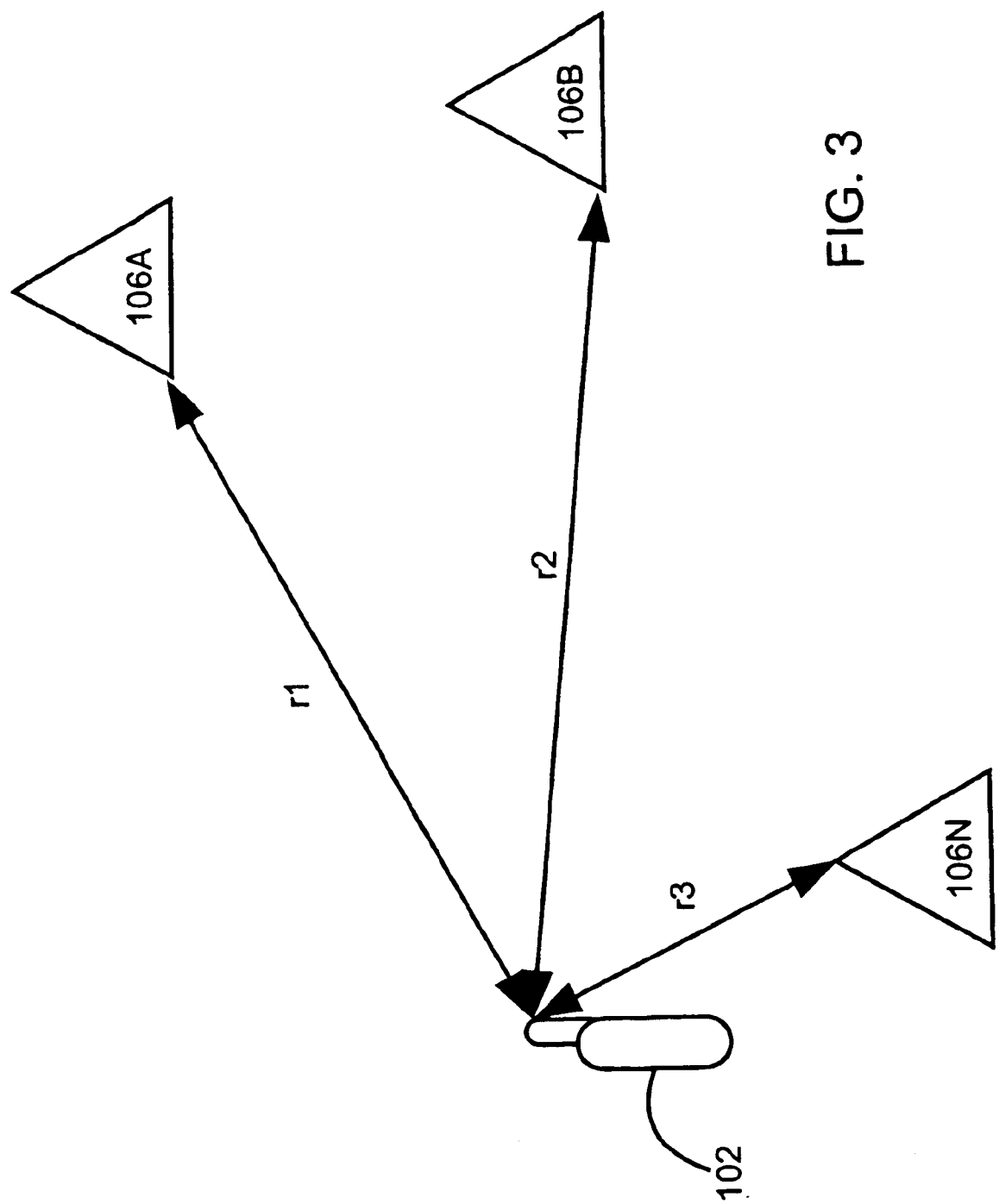
FIG. 3 depicts the geometry of a position determination using 3 DTV transmitters.

DTV location server 110 determines a position of the user terminal based on the pseudo-ranges and a location of each of the transmitters (step 206). FIG. 3 depicts the geometry of a position determination using three DTV transmitters 106. DTV transmitter 106A is located at position (x1, y1). The range between user terminal 102 and DTV transmitter 106A is r1. DTV 106B transmitter is located at position (x2, y2). The range between user terminal 102 and DTV transmitter 106B is r2. DTV transmitter 106N is located at position (x3, y3). The range between user terminal 102 and DTV transmitter 106N is r3.

DTV location server 110 may adjust the value of each pseudo-range according to the tropospheric propagation velocity and the time offset for the corresponding DTV transmitter 106. DTV location server 110 uses the phase center information from database 112 to determine the position of each DTV transmitter 106.

User terminal 102 makes three or more pseudo-range measurements to solve for three unknowns, namely the position (x, y) and clock offset T of user terminal 102. In other implementations, the techniques disclosed herein are used to determine position in three dimensions such as longitude, latitude, and altitude, and can include factors such as the altitude of the DTV transmitters.

The three pseudo-range measurements pr1, pr2 and pr3 are given by $$pr1 = r1 + T \quad (2)$$

$$pr2 = r2 + T \quad (3)$$

$$pr3 = r3 + T \quad (4)$$

The three ranges can be expressed as $$r1 = |X - X1| \quad (5)$$

$$r2 = |X - X2| \quad (6)$$

$$r3 = |X - X3| \quad (7)$$

where X represents the two-dimensional vector position (x, y) of user terminal, X1 represents the two-dimensional vector position (x1, y1) of DTV transmitter 106A, X2 represents the two-dimensional vector position (x2, y2) of DTV transmitter 106B, and X3 represents the two-dimensional vector position (x3, y3) of DTV transmitter 106N. These relationships produce three equations in which to solve for the three unknowns x, y, and T. DTV locations server 110 solves these equations according to conventional well-known methods. In an E911 application, the position of user terminal 102 is transmitted to E911 location server 116 for distribution to the proper authorities. In another application, the position is transmitted to user terminal 102.

In another implementation, user terminal 102 does not compute pseudo-ranges, but rather takes measurements of the DTV signals that are sufficient to compute pseudo-range, and transmits these measurements to DTV location server 110. DTV location server 110 then computes the pseudo-ranges based on the measurements, and computes the position based on the pseudo-ranges, as described above.

Position Location Performed by User Terminal

In another implementation, the position of user terminal 102 is computed by user terminal 102. In this implementation, all of the necessary information is transmitted to user terminal 102. This information can be transmitted to user terminal by DTV location server 110, base station 104, one or more DTV transmitters 106, or any combination thereof. User terminal 102 then measures the pseudo-ranges and solves the simultaneous equations as described above. This implementation is now described.

User terminal 102 receives the time offset between the local clock of each DTV transmitter and a reference clock. User terminal 102 also receives information describing the phase center of each DTV transmitter 106 from a database 112.

User terminal 102 receives the tropospheric propagation velocity computed by DTV locations server 110. In another implementation, user terminal 102 receives weather information describing the air temperature, atmospheric pressure, and humidity in the vicinity of user terminal 102 from a weather server 114. and determines tropospheric propagation velocity from the weather information using conventional techniques.

User terminal 102 can also receive from base station 104 information which identifies the rough location of user terminal 102. For example, the information can identify a cell or cell sector within which a cellular telephone is located. This information is used for ambiguity resolution, as described below.

User terminal 102 receives DTV signals from a plurality of DTV transmitters 106 and determines a pseudo-range between the user terminal 102 and each DTV transmitter 106. User terminal 102 then determines its position based on the pseudo-ranges and the phase centers of the transmitters.

In any of these of the implementations, should only two DTV transmitters be available, the position of user terminal 102 can be determined using the two DTV transmitters and the offset T computed during a previous position determination. The values of T can be stored or maintained according to conventional methods.

In one implementation, base station 104 determines the clock offset of user terminal 102. In this implementation, only two DTV transmitters are required for position determination. Base station 104 transmits the clock offset T to DTV location server 110, which then determines the position of user terminal 102 from the pseudo-range computed for each of the DTV transmitters.

In another implementation, when only one or two DTV transmitters are available for position determination, GPS is used to augment the position determination.

Receiver Architecture

Figure 4:
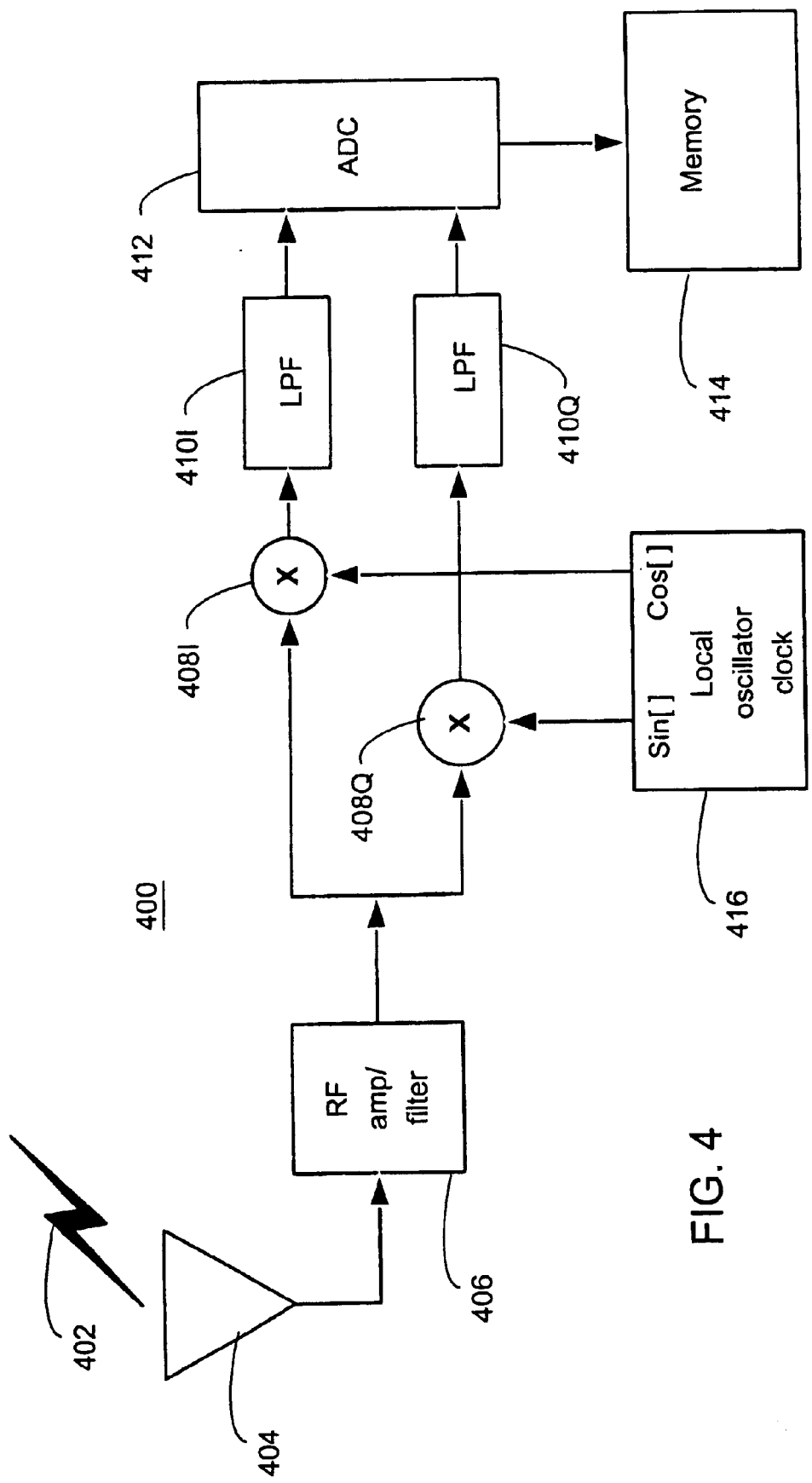
FIG. 4 depicts an implementation of a sampler for use in taking samples of received DTV signals.

FIG. 4 depicts an implementation 400 of a sampler for use in taking samples of received DTV signals. In one implementation, sampler 400 is implemented within user terminal 102. In another implementation, sampler 400 is implemented within monitor units 108. The sampling rate should be sufficiently high to obtain an accurate representation of the DTV signal, as would be apparent to one skilled in the art.

Sampler 400 receives a DTV signal 402 at an antenna 404. A radio frequency (RF) amp/filter 406 amplifies and filters the received DTV signal. A local oscillator clock 416 and mixers 408I and 408Q downconvert the signal to produce in-phase (I) and quadrature (Q) samples, respectively. The I and Q samples are respectively filtered by low-pass filters (LPF) 410I and 410Q. An analog-to-digital converter (ADC) 412 converts the I and Q samples to digital form. The digital I and Q samples are stored in a memory 414.

Figure 5:
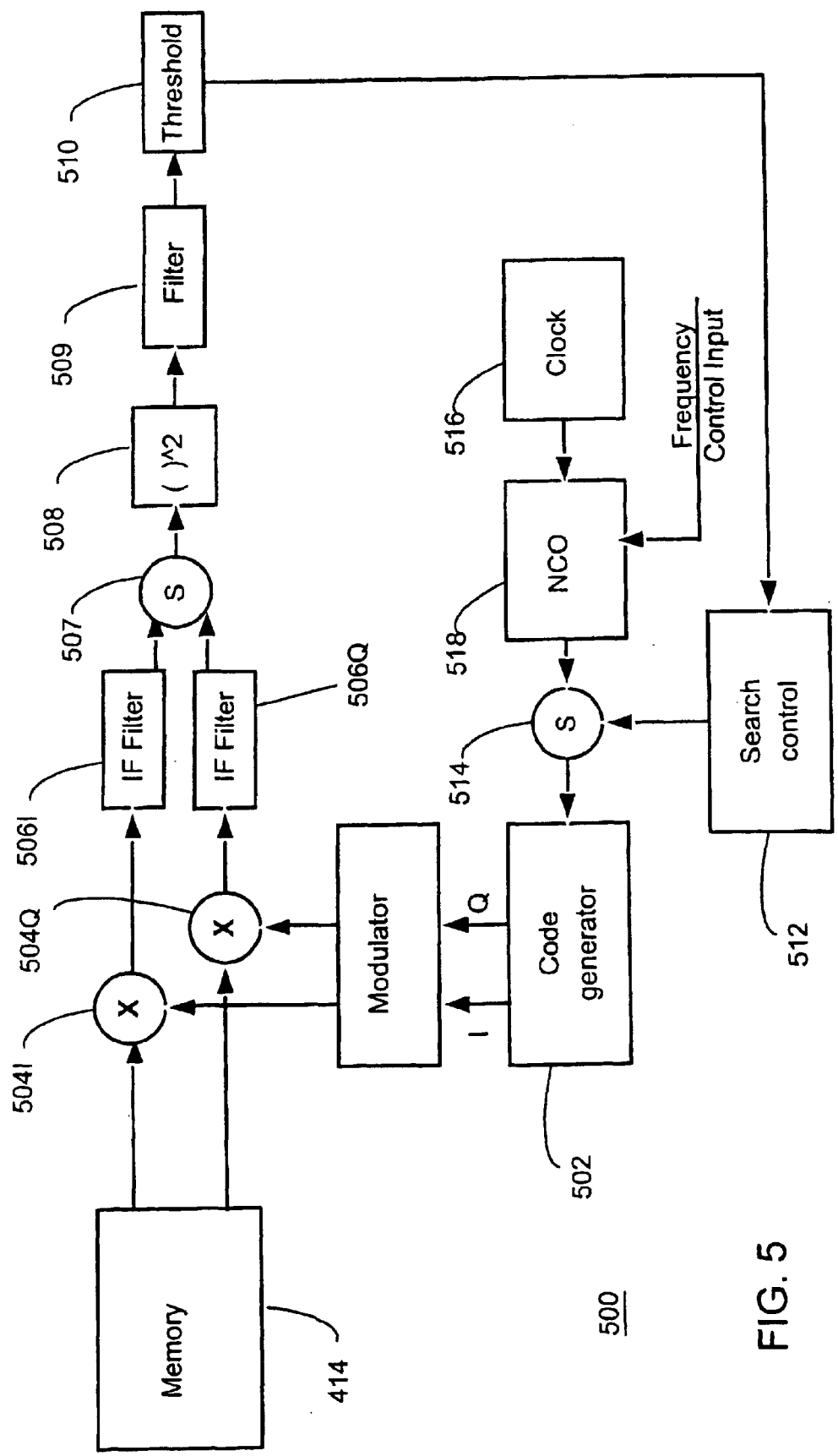
FIG. 5 depicts an implementation of a noncoherent correlator for use in searching for the correlation peak of the DTV signal samples produced by the sampler of FIG. 4.

FIG. 5 depicts an implementation 500 of a noncoherent correlator for use in searching for the correlation peak of the DTV signal samples produced by sampler 400. In one implementation, correlator 500 is implemented within user terminal 102. In another implementation, correlator 500 is implemented within monitor units 108.

Correlator 500 retrieves the I and Q samples of a DTV signal from memory 414. Correlator 500 processes the samples at intermediate frequency (IF). Other implementations process the samples in analog or digital form, and can operate at intermediate frequency (IF) or at baseband.

A code generator 502 generates a code sequence. In one implementation, the code sequence is a raised cosine waveform. The code sequence can be any known digital sequence in the ATSC frame. In one implementation, the code is a synchronization code. In one implementation, the synchronization code is a Field Synchronization Segment within an ATSC data frame. In another implementation, the synchronization code is a Synchronization Segment within a Data Segment within an ATSC data frame. In still another implementation, the synchronization code includes both the Field Synchronization Segment within an ATSC data frame and the Synchronization Segments within the Data Segments within an ATSC data frame. Other components of the DTV signal, such as pilot, symbol clock, or carrier, can be used for position location. However, the use of such signals, which have a high repetition rate, produces inherent ambiguities. Techniques for resolving such ambiguities are well-known in the art. One such technique is disclosed in M. Rabinowitz, PhD Thesis: A Differential Carrier Phase Navigation System Combining GPS with Low Earth Orbit Satellites for Rapid Resolution of Integer Cycle Ambiguities, 2000, Department of Electrical Engineering, Stanford University, pages 59–76.

Mixers 504I and 504Q respectively combine the I and Q samples with the code generated by code generator 502. The outputs of mixers 504I and 504Q are respectively filtered by filters 506I and 506Q and provided to summer 507. The sum is provided to square law device 508. Filter 509 performs an envelope detection for non-coherent correlation, according to conventional methods. Comparator 510 compares the correlation output to a predetermined threshold. If the correlation output falls below the threshold, search control 512 causes summer 514 to add additional pulses to the clocking waveform produced by clock 516, thereby advancing the code generator by one symbol time, and the process repeats. In a preferred embodiment, the clocking waveform has a nominal clock rate of 10.76 MHz, matching the clock rate or symbol rate the received DTV signals.

When the correlation output first exceeds the threshold, the process is done. The time offset that produced the correlation output is used as the pseudo-range for that DTV transmitter 106.

In receiver correlators and matched filters there are two important sources of receiver degradation. The user terminal local oscillator is often of relatively poor stability in frequency. This instability affects two different receiver parameters. First, it causes a frequency offset in the receiver signal. Second, it causes the received bit pattern to slip relative to the symbol rate of the reference clock. Both of these effects can limit the integration time of the receiver and hence the processing gain of the receiver. The integration time can be increased by correcting the receiver reference clock. In one implementation a delay lock loop automatically corrects for the receiver clock.

In another implementation a NCO (numerically controlled oscillator) 518 adjusts the clock frequency of the receiver to match that of the incoming received signal clock frequency and compensate for drifts and frequency offsets of the local oscillator in user terminal 102. Increased accuracy of the clock frequency permits longer integration times and better performance of the receiver correlator. The frequency control input of NCO 518 can be derived from several possible sources, a receiver symbol clock rate synchronizer, tracking of the ATSC pilot carrier, or other clock rate discriminator techniques installed in NCO 518.

Position Location Enhancements

Figure 6:
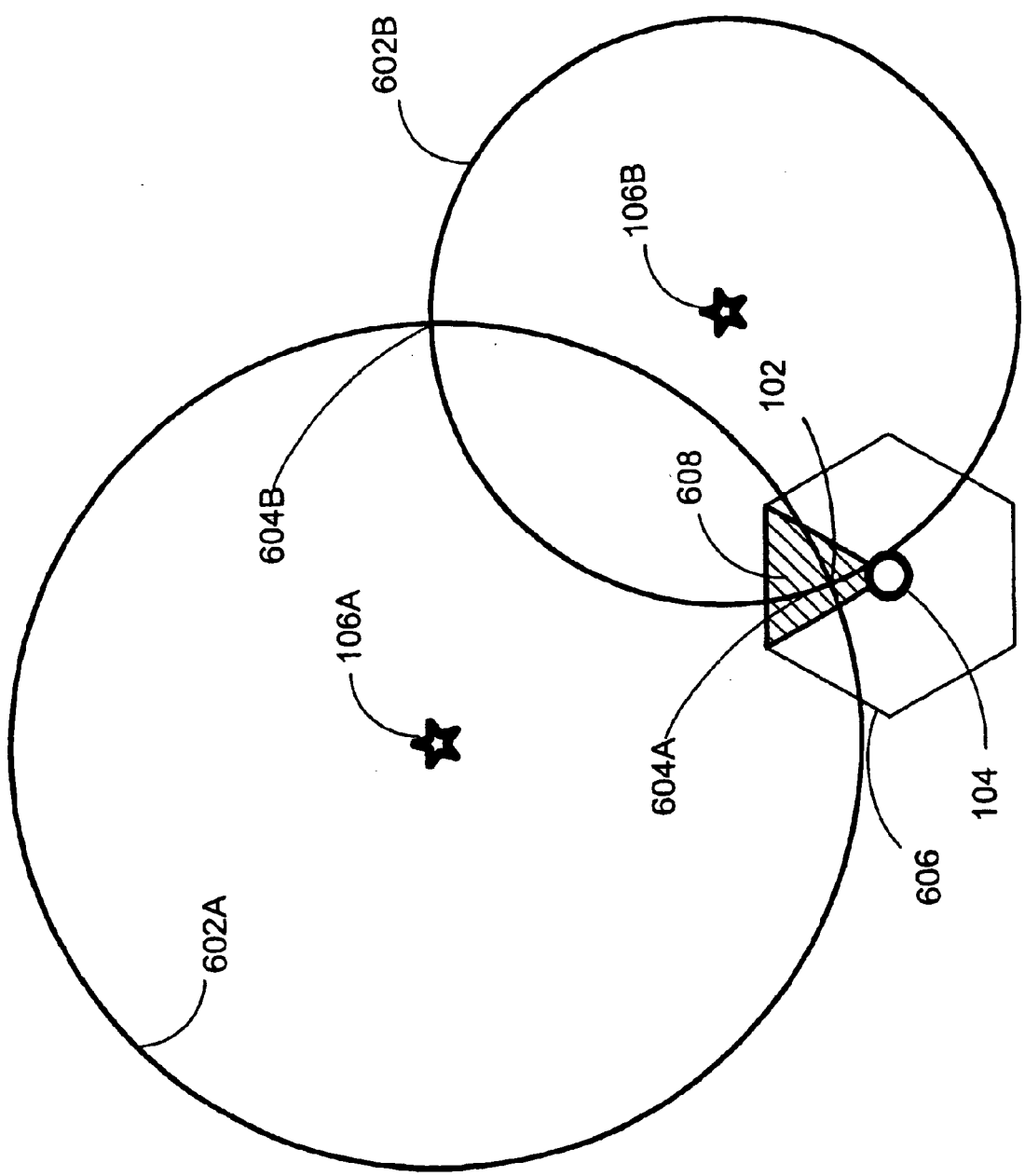
FIG. 6 illustrates a simple example of a position location calculation for a user terminal receiving DTV signals from two separate DTV antennas.

FIG. 6 illustrates a simple example of a position location calculation for a user terminal 102 receiving DTV signals from two separate DTV antennas 106A and 106B. Circles of constant range 602A and 602B are drawn about each of transmit antennas 106A and 106B, respectively. The position for a user terminal, including correction for the user terminal clock offset, is then at one of the intersections 604A and 604B of the two circles 602A and 602B. The ambiguity is resolved by noting that base station 104 can determine in which sector 608 of its footprint (that is, its coverage area) 606 the user terminal is located. Of course if there are more than two DTV transmitters in view, the ambiguity can be resolved by taking the intersection of three circles.

In one implementation, user terminal 102 can accept an input from the user that gives a general indication of the area, such as the name of the nearest city. In one implementation, user terminal 102 scans available DTV channels to assemble a fingerprint of the location. User terminal 102 compares this fingerprint to a stored table that matches known fingerprints with known locations to identify the current location of user terminal 102.

Figure 7:
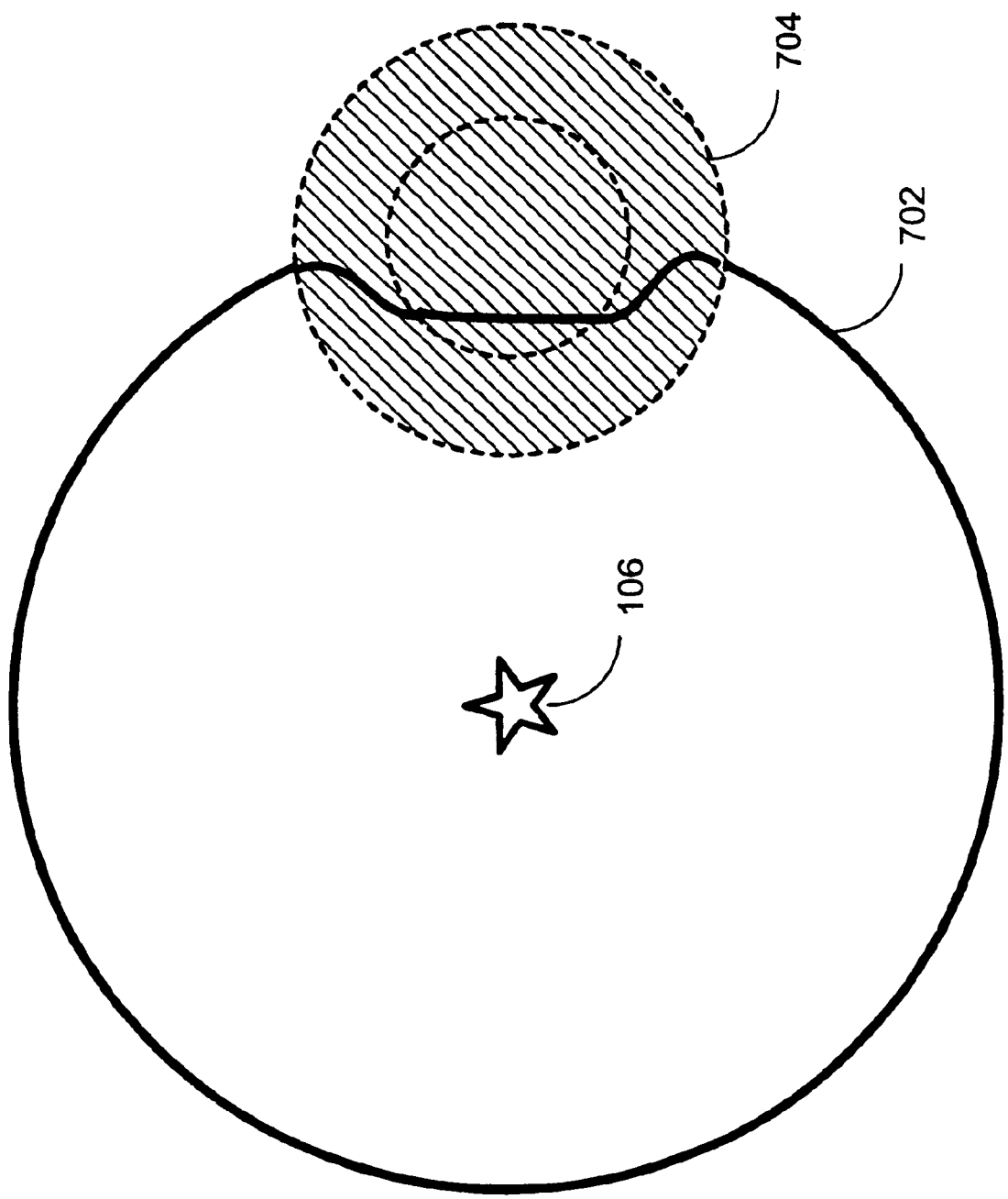
FIG. 7 depicts the effects of a single hill on a circle of constant range for a DTV transmitter that is located at the same altitude as the surrounding land.

In one implementation the position location calculation includes the effects of ground elevation. Thus in terrain with hills and valleys relative to the phase center of the DTV antenna 106 the circles of constant range are distorted. FIG. 7 depicts the effects of a single hill 704 on a circle of constant range 702 for a DTV transmitter 106 that is located at the same altitude as the surrounding land.

The computations of user position are easily made by a simple computer having as its database a terrain topographic map which allows the computations to include the effect of user altitude on the surface of the earth, the geoid. This calculation has the effect of distorting the circles of constant range as shown in FIG. 7.

ATSC Signal Description

Figure 8:
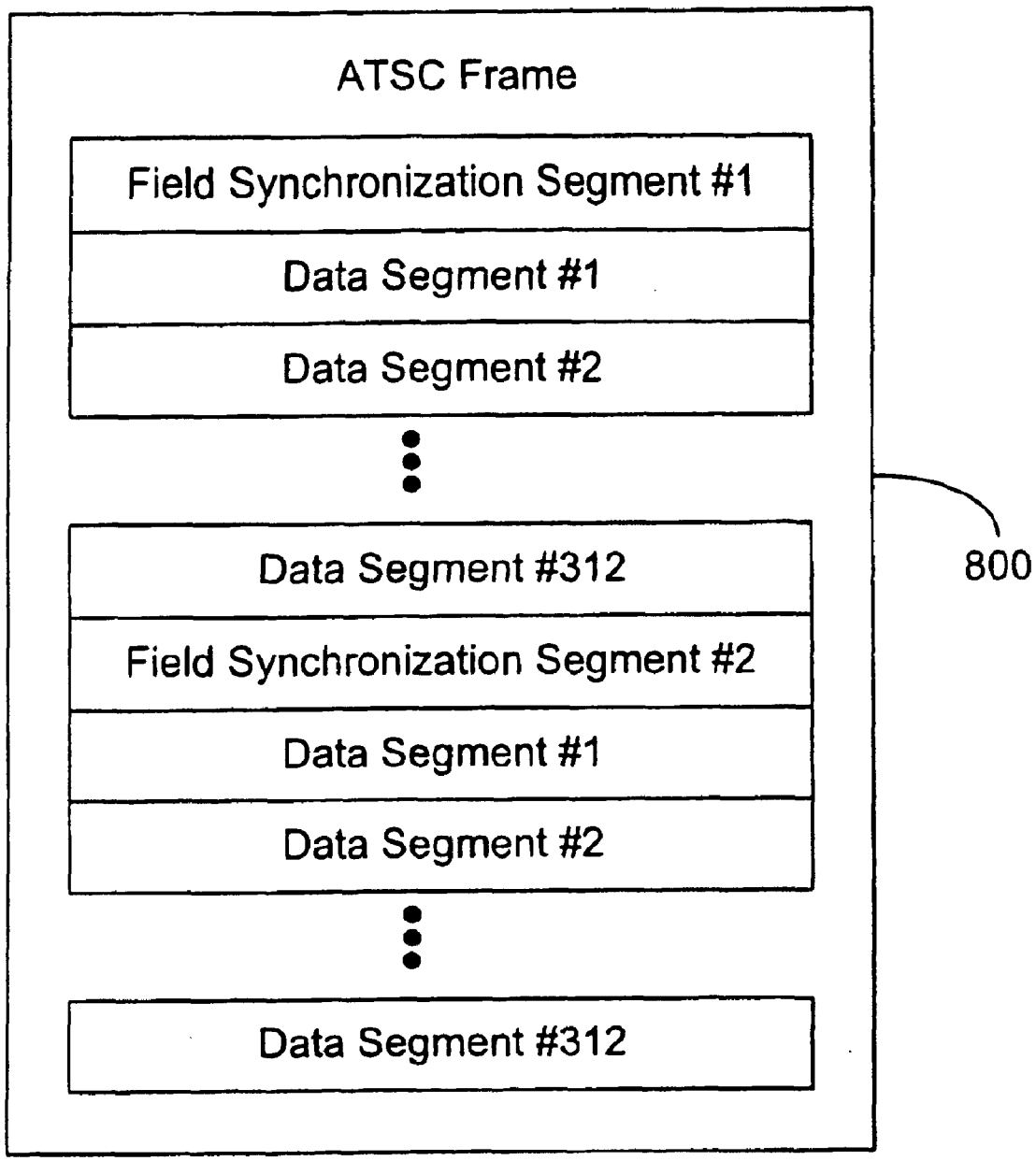
FIG. 8 illustrates the structure of the ATSC frame.

The current ATSC signal is described in "ATSC Digital Television Standard and Amendment No. 1," Mar. 16, 2000, by the Advanced Television Systems Committee. The ATSC signal uses 8-ary Vestigial Sideband Modulation (8VSB). The symbol rate of the ATSC signal is 10.762237 MHz, which is derived from a 27.000000 MHz clock. The structure 800 of the ATSC frame is illustrated in FIG. 8. The frame 800 consists of a total of 626 segments, each with 832 symbols, for a total of 520832 symbols. There are two field synchronization segments in each frame. Following each field synchronization segment are 312 data segments. Each segment begins with 4 symbols that are used for synchronization purposes.

The structure 900 of the field synchronization segment is illustrated in FIG. 9. The two field synchronization segments 900 in a frame 800 differ only to the extent that the middle set of 63 symbols are inverted in the second field synchronization segment.

The structure 1000 of the data segment is illustrated in FIG. 10. The first four symbols of data segment 1000 (which are −1, 1, 1, −1) are used for segment synchronization. The other 828 symbols in data segment 1000 carry data. Since the modulation scheme is 8VSB, each symbol carries 3 bits of coded data. A rate ⅔ coding scheme is used.

Implementations of the invention can be extended to use future enhancements to DTV signals. For example, the ATSC signal specification allows for a high rate 16VSB signal. However, the 16VSB signal has the same field synch pattern as the 8VSB signal. Therefore, a single implementation of the present invention can be designed to work equally well with both the 8VSB and the 16VSB signal.

Figure 11:
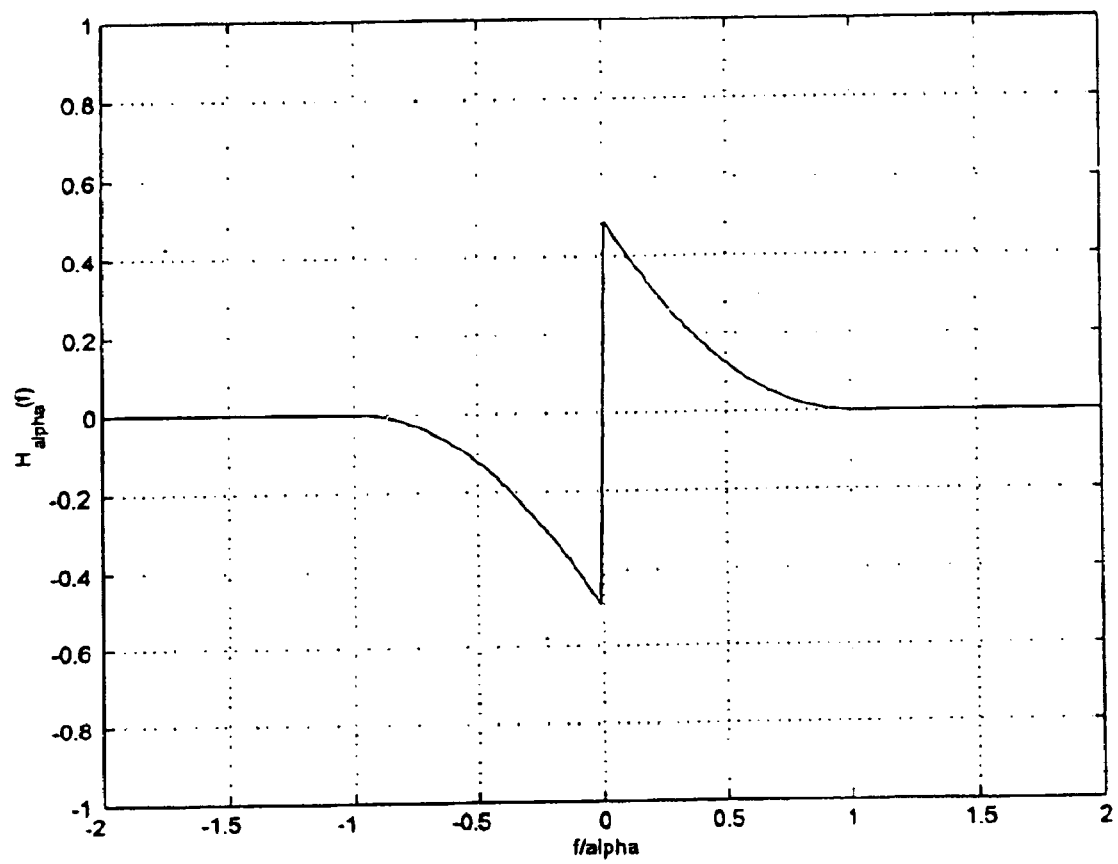
FIG. 11 shows a plot of the gain function for a filter used in producing an ATSC DTV signal.

The 8VSB signal is constructed by filtering. The in-phase segment of the symbol pulse has a raised-cosine characteristic, as described in J. G. Proakis, Digital Communications, McGraw-Hill, 3$^{rd}$ edition, 1995. The pulse can be described as $$p(t) = \text{sinc}\left(\frac{\pi t}{T}\right) \frac{\cos\left(\frac{\pi \beta t}{T}\right)}{1 - \frac{4\beta^2 t^2}{T^2}} \tag{8}$$

where T is the symbol period $$T = \frac{1}{10.76 \times 10^6} \tag{9}$$

and β=0.5762. This signal has a frequency characteristic $$P(f) = \begin{cases} \frac{T}{2}\left\{1 + \cos\left[\frac{\pi T^T}{\beta_0}\left(|f| - \frac{1-\beta}{2T}\right)\right]\right\} \left(\frac{1-\beta}{2T} \leq |f| \leq \frac{1+\beta}{2T}\right) & \left(0 \leq |f| \leq \frac{1-\beta}{2T}\right) \\ & \left(|f| > \frac{1+\beta}{2T}\right) \end{cases} \tag{10}$$

from which it is clear that the one-sided bandwidth of the signal is (1+β)10.762237 MHz=5.38 MHz+0.31 MHz. In order to create a VSB signal from this in-phase pulse, the signal is filtered so that only a small portion of the lower sideband remains. This filtering can be described as:

$$P_v(f) = P(f)(U(f) - H_\alpha(f)) \tag{11}$$

where $$U(f) = \begin{cases} 1, f \geq 0 \\ 0, f < 0 \end{cases} \tag{12}$$

where $H_\alpha(f)$ is a filter designed to leave a vestigal remainder of the lower sideband. A plot of the gain function for $H_\alpha(f)$ is shown in FIG. 11. The filter satisfies the characteristics $H_\alpha(-f) = -H_\alpha(f)$ and $H_\alpha(f) = 0$, f>α.

The response U(f)P(f) can be represented as $$U(f)P(f) = \frac{1}{2}\left(P(f) + j\breve{P}(f)\right) \tag{13}$$

where $\breve{P}(f) = -j\text{sgn}(f)P(f)$ is the Hilbert transform of P(f). The VSB pulse may be represented as $$P_v(f) = \frac{1}{2}X(f) + \frac{j}{2}\left(\breve{X}(f) + 2X(f)H_\alpha(f)\right) \tag{14}$$

and the baseband pulse signal $$p_v(t) = \frac{1}{2}x(t) + \frac{j}{2}\left(\breve{x}(t) + x_\alpha(t)\right) = p_{vi}(t) + jp_{vq}(t) \tag{15}$$

where $p_{vi}(t)$ is the in-phase component, $p_{vq}(t)$ is the quadrature component, and $$x_\alpha(t) = 2\int_{-\alpha}^{\alpha} X(f)H_\alpha(f)e^{j2\pi f t}df \tag{16}$$

Before the data is transmitted, the ATSC signal also embeds a carrier signal, which has −11.5 dB less power than the data signal. This carrier aids in coherent demodulation of the signal. Consequently, the transmitted signal can be represented as:

$$s(t) = \sum_n C_n\{p_{vi}(t-nT)\cos(\omega t) - p_{vq}(t-nT)\sin(\omega t)\} + A\cos(\omega t) \tag{17}$$

where $C_n$ is the 8-level data signal.

Monitor Units

Figure 12:
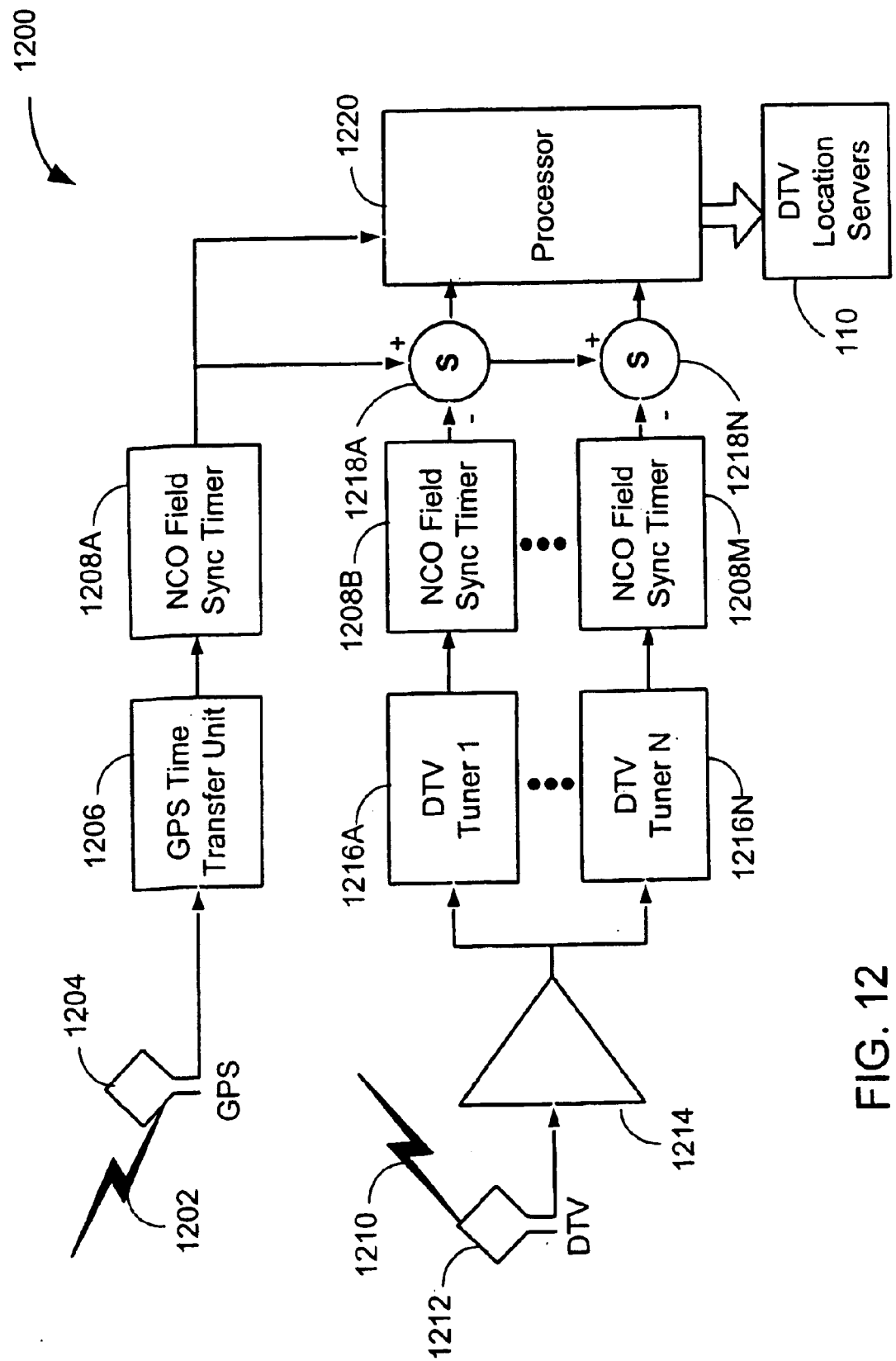
FIG. 12 depicts an implementation of a monitor unit.

FIG. 12 depicts an implementation 1200 of monitor unit 108. An antenna 1204 receives GPS signals 1202. A GPS time transfer unit 1206 develops a master clock signal based on the GPS signals. In order to determine the offset of the DTV transmitter clocks, a NCO (numerically controlled oscillator) field synchronization timer 1208A develops a master synchronization signal based on the master clock signal. The master synchronization signal can include one or both of the ATSC segment synchronization signal and the ATSC field synchronization signal. In one implementation, the NCO field synchronization timers 1208A in all of the monitor units 108 are synchronized to a base date and time. In implementations where a single monitor unit 108 receives DTV signals from all of the same DTV transmitters that user terminal 102 does, it is not necessary to synchronize that monitor unit 108 with any other monitor unit for the purposes of determining the position of user terminal 102. Such synchronization is also unnecessary if all of the monitor stations 108, or all of the DTV transmitters, are synchronized to a common clock.

A DTV antenna 1212 receives a plurality of DTV signals 1210. In another implementation, multiple DTV antennas are used. An amplifier 1214 amplifies the DTV signals. One or more DTV tuners 1216A through 1216N each tunes to a DTV channel in the received DTV signals to produce a DTV channel signal. Each of a plurality of NCO field synchronization timers 1208B through 1208M receives one of the DTV channel signals. Each of NCO field synchronization timers 1208B through 1208M extracts a channel synchronization signal from a DTV channel signal. The channel synchronization signal can include one or both of the ATSC segment synchronization signal and the ATSC field synchronization signal. Note that the pilot signal and symbol clock signal within the DTV signal can be used as acquisition aids.

Each of a plurality of summers 1218A through 1218N generates a clock offset between the master synchronization signal and one of the channel synchronization signals. Processor 1220 formats and sends the resulting data to DTV location server 110. In one implementation, this data includes, for each DTV channel measured, the identification number of the DTV transmitter, the DTV channel number, the antenna phase center for the DTV transmitter, and the clock offset. This data can be transmitted by any of a number of methods including air link and the Internet. In one implementation, the data is broadcast in spare MPEG packets on the DTV channel itself.

Software Receivers

One thorough approach to mitigating the effects of multipath is to sample an entire autocorrelation function, rather than to use only early and late samples as in a hardware setup. Multipath effects can be mitigated by selecting the earliest correlation peak.

In the case that position can be computed with a brief delay, such as in E911 applications, a simple approach is to use a software receiver, which samples a sequence of the filtered signal, and then processes the sample in firmware on a DSP.

Figure 13:
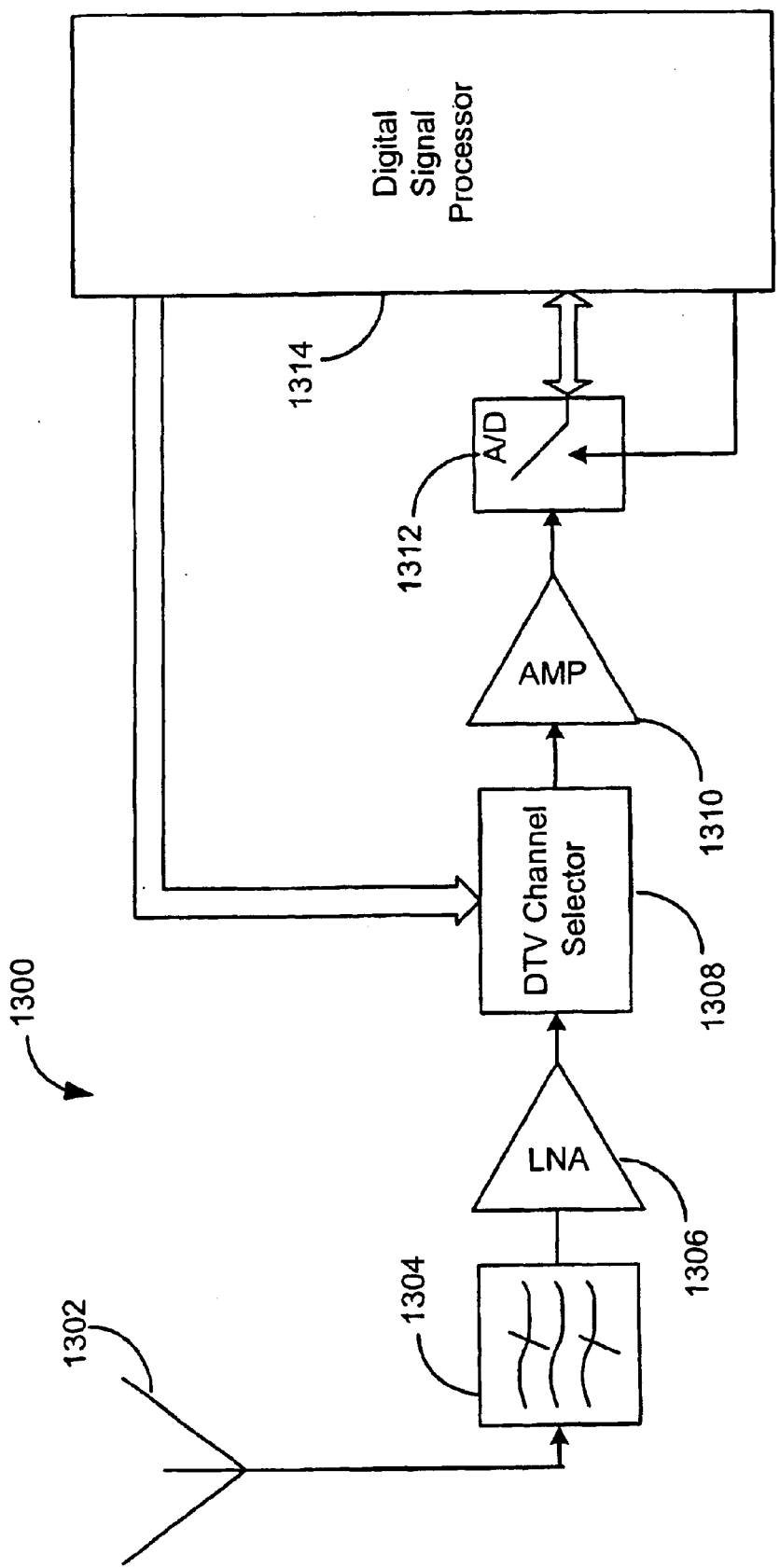
FIG. 13 illustrates one implementation for tracking in software.

FIG. 13 illustrates one implementation 1300 for tracking in software. An antenna 1302 receives a DTV signal. Antenna 1302 can be a magnetic dipole or any other type of antenna capable of receiving DTV signals. A bandpass filter 1304 passes the entire DTV signal spectrum to an LNA 1306. In one implementation, filter 1304 is a tunable bandpass filter that passes the spectrum for a particular DTV channel under the control of a digital signal processor (DSP) 1314.

A low-noise amplifier (LNA) 1306 amplifies and passes the selected signal to a DTV channel selector 1308. DTV channel selector 1308 selects a particular DTV channel under the control of DSP 1314, and filters and downconverts the selected channel signal from UHF (ultra-high frequency) to IF (intermediate frequency) according to conventional methods. An amplifier (AMP) 1310 amplifies the selected IF channel signal. An analog-to-digital converter and sampler (A/D) 1312 produces digital samples of the DTV channel signal s(t) and passes these samples to DSP 1314.

Now the processing of the DTV channel signal by DSP 1314 is described for a coherent software receiver. A nominal offset frequency for the downconverted sampled signal is assumed. If this signal is downconverted to baseband, the nominal offset is 0 Hz. The process generates the complete autocorrelation function based on samples of a signal s(t). The process may be implemented far more efficiently for a low duty factor signal. Let $T_i$ be the period of data sampled, $\omega_{in}$ be the nominal offset of the sampled incident signal, and let $\omega_{offset}$ be the largest possible offset frequency, due to Doppler shift and oscillator frequency drift. The process implements the pseudocode listed below.

Rmax=0

Create a complex code signal $s_{code}(t)=\Sigma \overline{C}_n\{p_{vi}(t-nT_i)+jp_{vq}(t-nT_i)\}$ where $\overline{C}_n$ is zero for all symbols corresponding to data signals and non-zero for all symbols corresponding to synchronization signals.

- For $\omega = \omega_{in} - \omega_{offset}$ to $\omega_{in} + \omega_{offset}$ step $0.5 \frac{\pi}{T_i}$ Create a complex mixing signal $s_{mix}(t)=\cos(\omega t)+j\sin(\omega t), t=[0 \ldots T_i]$ Combine the incident signal s(t) and the mixing signal $s_{mix}(t)$ $s_{comb}(t)=s(t)s_{mix}(t)$ Compute the correlation function $R(\tau)=s_{code}*s_{comb}(\tau)$ If $\max_\tau|R(\tau)|>R_{max}$, $R_{max} \leftarrow \max_\tau|R(\tau)|, R_{store}(\tau)=R(\tau)$ Next $\omega$ Upon exit from the process, $R_{store}(\tau)$ will store the correlation between the incident signal s(t) and the complex code signal $s_{code}(t)$. $R_{store}(\tau)$ may be further refined by searching over smaller steps of $\omega$. The initial step size for $\omega$ must be less then half the Nyquist rate $\frac{2\pi}{T_i}$.

The time offset $\tau$ that produces the maximum correlation output is used as the pseudo-range.

A technique for generating the non-coherent correlation in software is now described. This approach emulates the hardware receivers of FIGS. 4 and 5. Note that while the I and Q channels are treated separately in the block diagrams, the I and Q components may be combined to generate the mixing signal in software. Since the non-coherent correlator uses envelope detection, it is not necessary to search over a range of intermediate frequencies. The process implements the pseudocode listed below.

Create the in-phase and quadrature code signals $c_i(t)=\Sigma \overline{C}_n p_{vq}(t-nT_i)$, $c_q(t)=\Sigma \overline{C}_n p_{vq}(t-nT_i)$ where the sum is over n, $\overline{C}_n$ is zero for all symbols corresponding to data signals and non-zero for all symbols corresponding to synchronization signals. Note that $c_i$ has autocorrelation $R_i$, $c_q$ has autocorrelation $R_q$, and that their cross-correlation is $R_{ij}$.

For $\tau=0$ to $T_{per}$ step $T_{samp}$ where $T_{per}$ is the period of the code being used, and $T_{samp}$ is the sample interval Create a reference code mixing signal $s_{mix}(t)=c_i(t+\tau)\cos(\omega t+\upsilon t+\phi)+c_q(t+\tau)\sin(\omega t+\upsilon t+\phi)$ where $\omega$ is the nominal IF frequency of the incident signal, $\upsilon$ is the frequency offset of the mixing signal relative to the incident signal, and $\phi$ is the phase offset of the mixing signal from the incident signal. Combine the incident signal s(t) and the reference code mixing signal $s_{mix}(t)$. $s_{comb}(t)=s(t)s_{mix}(t)$ Low-pass filter $s_{comb}(t)$ to generate $s_{filt}(t)$ such that the expected value of $s_{filt}(t)$ is given by $E[s_{filt}(t)]=2R_i(\tau)\cos(\upsilon t+\phi)+2R_{iq}(\tau)\sin(\upsilon t+\phi)$ where we have used that fact that $R_i(\tau)=-R_q(\tau)$ Perform envelope detection on $s_{filt}(t)$ (for example, by squaring and filtering) to generate the non-coherent correlation: $z(\tau)=2[R_i(\tau)^2+R_{iq}(\tau)^2]$ Next $\tau$ The time offset τ that produces the maximum correlation output is used as the pseudo-range.

Figure 14:
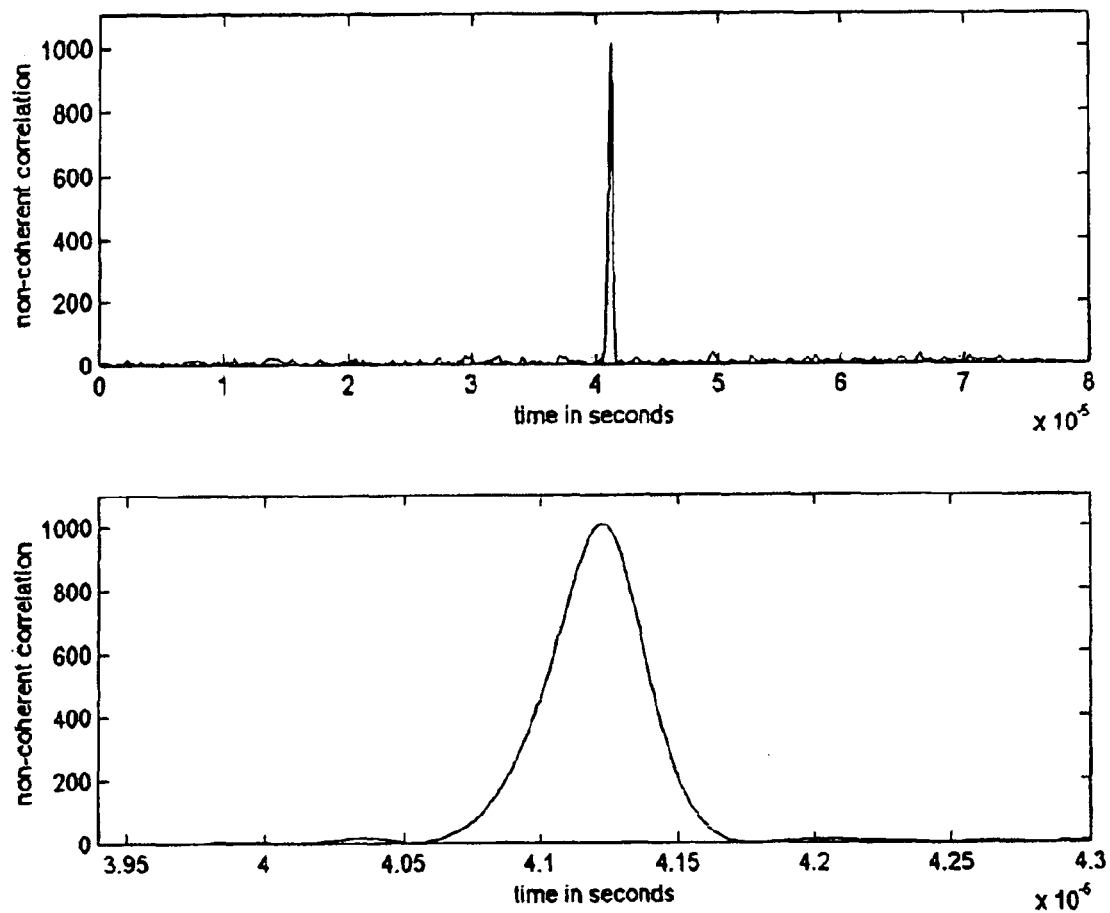
FIG. 14 shows a plot of the output of the non-coherent correlator.

Notice that the non-coherent correlation $z(\tau)$ makes use of the signal power in both the in-phase and quadrature components. However, as a result of this, the effective bandwidth of the signal that generates the non-coherent correlation is halved. The output of the non-coherent correlator is illustrated in FIG. 14. The upper plot shows the correlation peak for an interval of roughly $8 \times 10^{-5}$ seconds. The upper plot shows the effective 3 MHz bandwidth of the correlation peak.

Experimental Results

Figure 15:
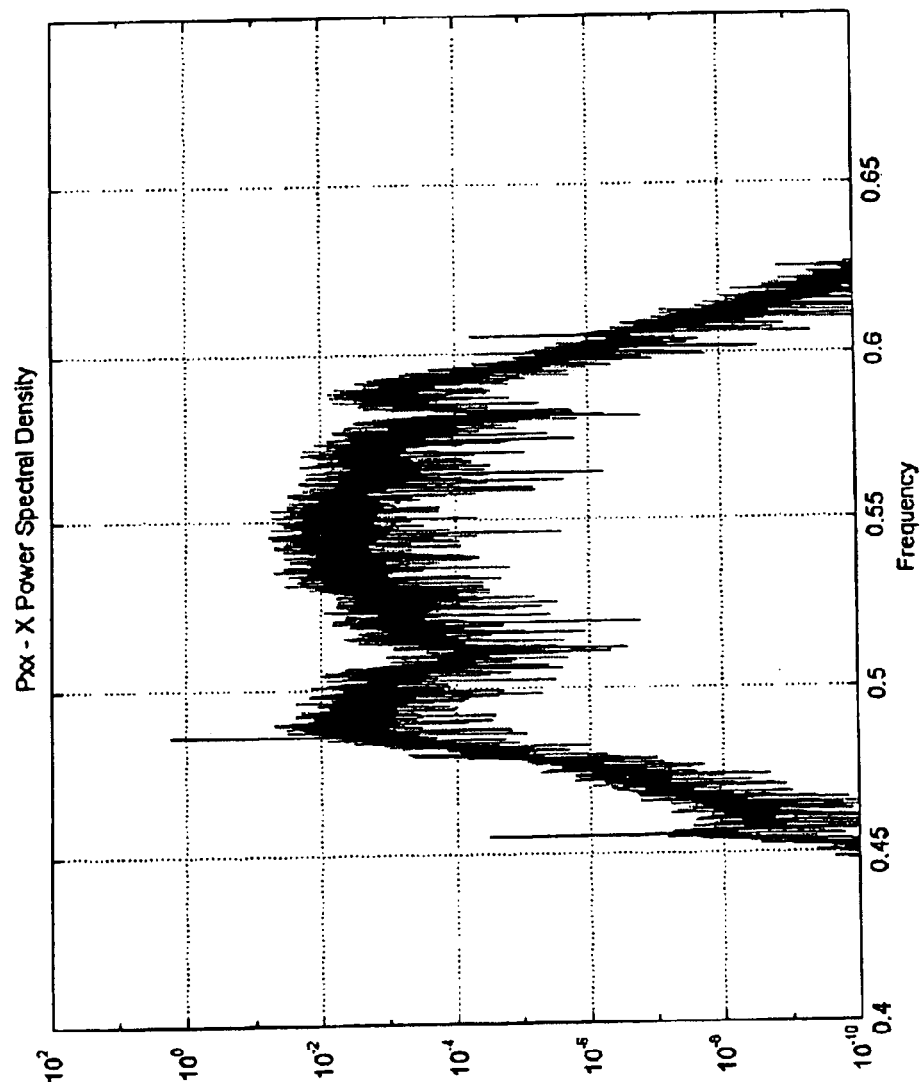
FIG. 15 displays an example spectrum for a 1 millisecond sample of the signal from a KICU channel 52 DTV broadcast from San Jose.

A technique similar to that described above for tracking in software was applied to DTV transmissions arising from San Jose, Calif. and received indoors in Palo Alto, Calif. This example is presented for illustration purposes and not to limit the scope of the present invention. FIG. 15 displays an example spectrum for a 1 millisecond sample of the signal from a KICU channel 52 DTV broadcast from San Jose. The signal was downconverted to a center frequency of 27 MHz, which corresponds to a digital frequency of 0.54 for a sampling rate of 100 mega-samples per second. The signal was digitally bandpass filtered to a bandwidth of 6 MHz.

Figure 16:
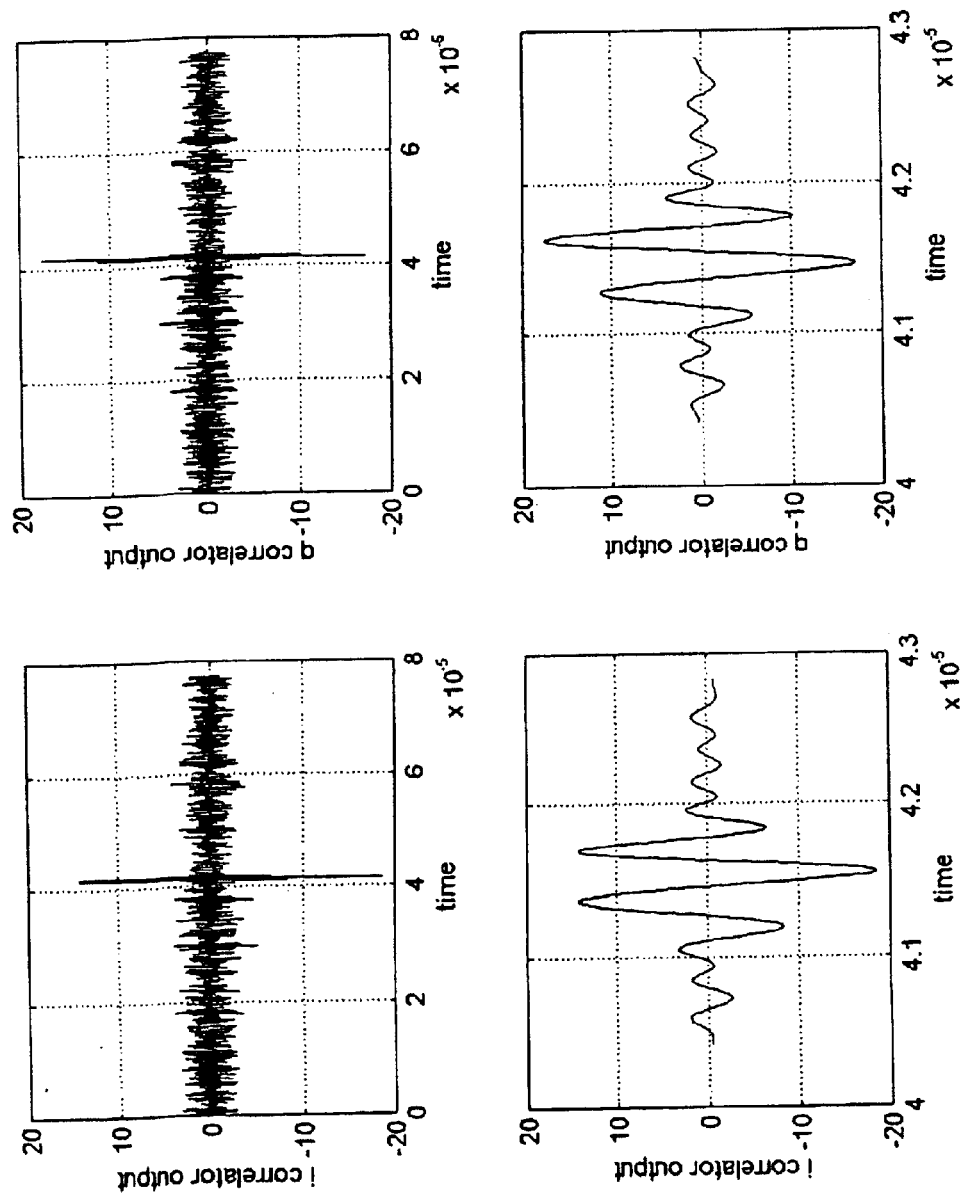
FIG. 16 shows the computed autocorrelation function for the in-phase and quadrature component of the resulting 6 MHz signal.

The computed autocorrelation function for the in-phase and quadrature component of the resulting 6 MHz signal is illustrated in FIG. 16. Note that this is the autocorrelation for only the 4 data synchronization symbols at the beginning of each segment.

Figure 17:
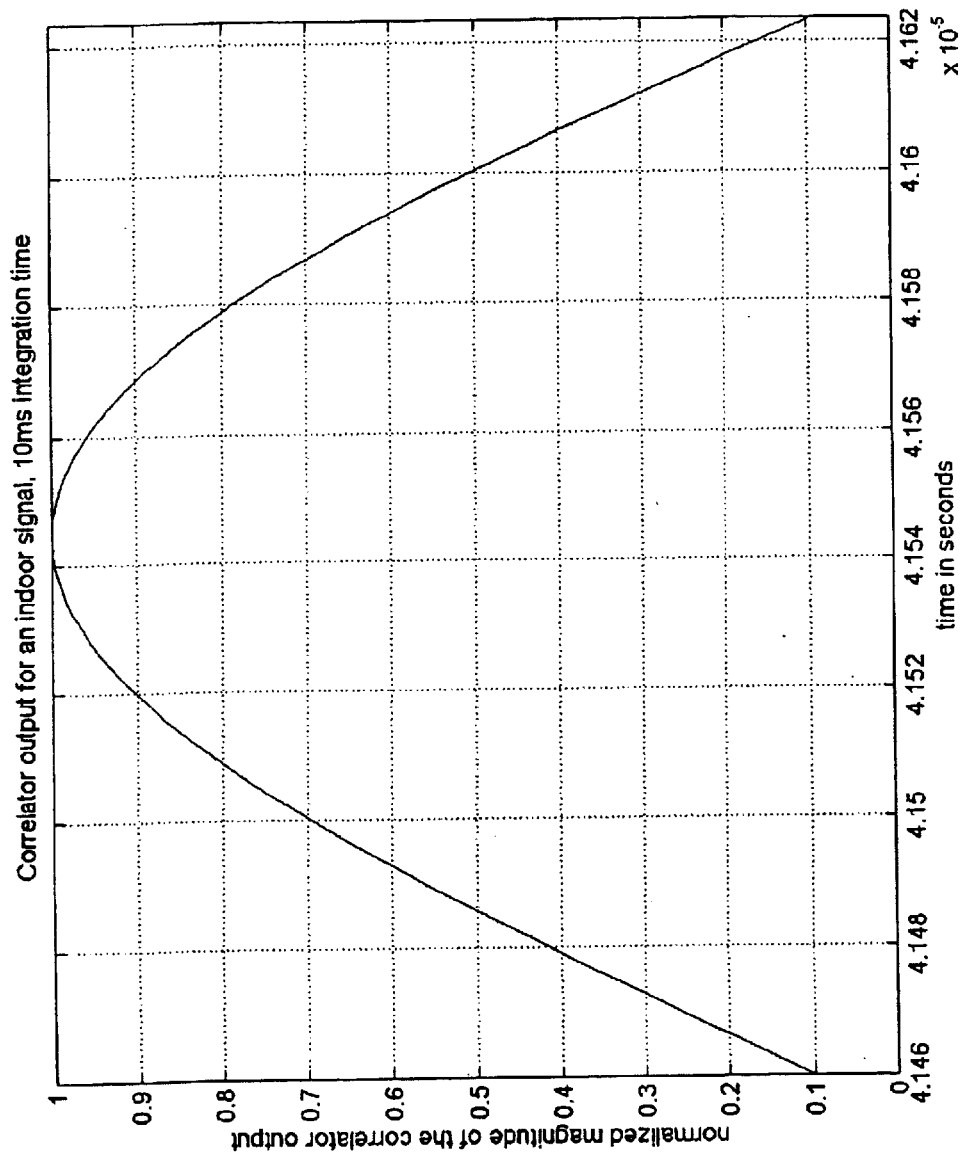
FIG. 17 shows the characteristics of the 6 MHz signal.

The characteristics of the 6 MHz signal are shown in FIG. 17. FIG. 17 displays a portion of the autocorrelation peak for the in-phase channel. From the smoothness of the curve, one can see that the signal-to-noise ratio is high. In addition, the curvature of the peak indicates the high signal bandwidth which makes this signal robust to multipath.

Figure 18:
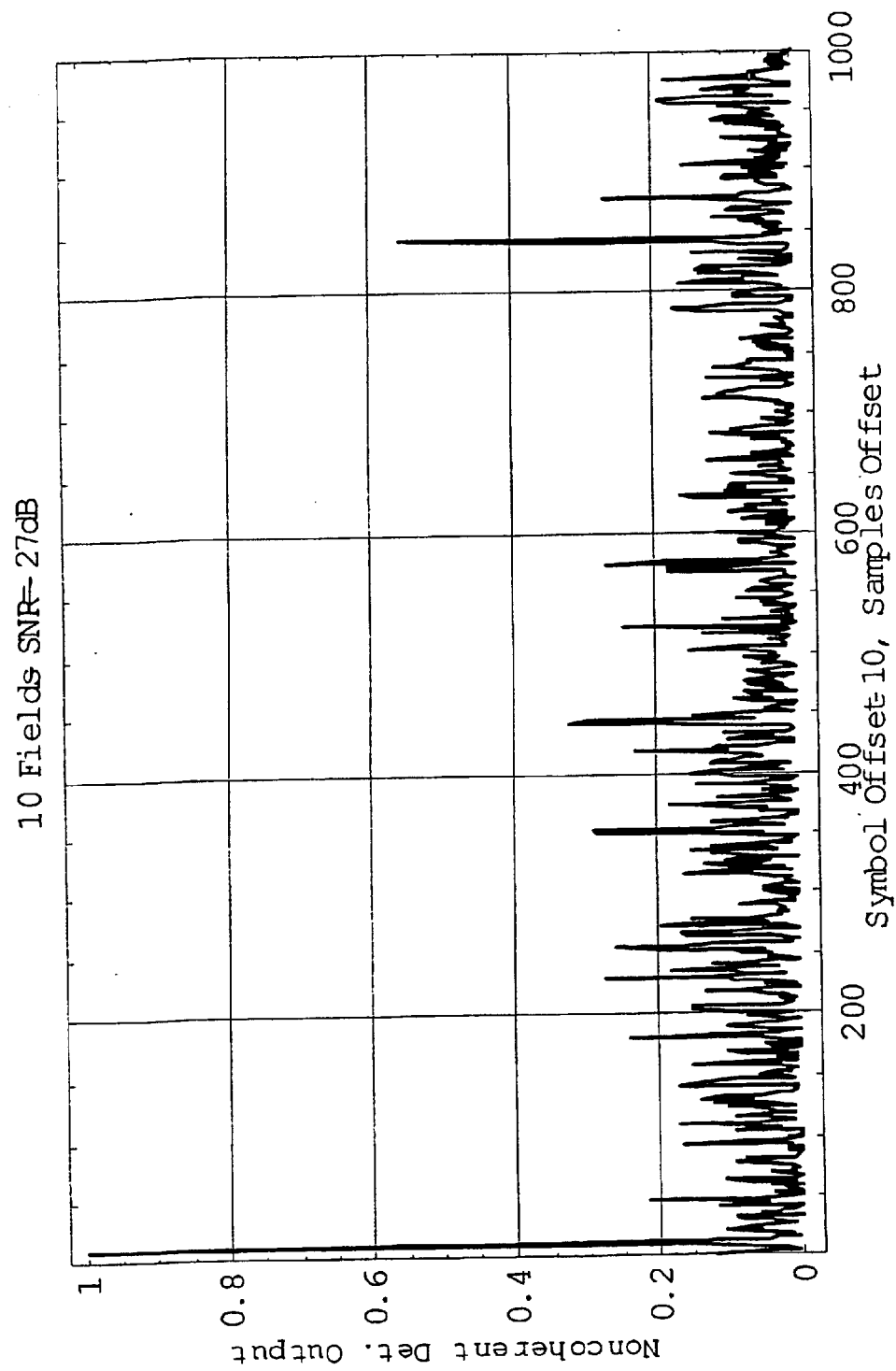
FIG. 18 depicts the results of a simulation of the operation of the correlator of FIG. 5.

FIG. 18 depicts the results of a simulation of the operation of correlator 500. The simulation was conducted using Mathematica software produced by Wolfram Research. The simulation input is the digital I and Q samples stored in a memory 414 by sampler 400.

FIG. 18 shows the noncoherent correlation result for symbol-synchronous sampling at a 10.76 MHz complex sample rate and an integration time of 242 milliseconds or 10 fields. The simulation is a worst case where the samples are offset by ½ symbol or 0.05 microseconds.

The simulation also includes Gaussian noise and a signal-to-noise ratio (SNR) in the 6 MHz bandwidth of −27 dB. With a phase offset of the sampling this result degrades by 2 dB but clearly the performance would still be excellent. Normal DTV reception requires a SNR of approximately +18 dB. Correlator 500 can recover tracking information at a SNR 18+27=45 dB below normal DTV. This result requires accurate correction of the sampling clock if a matched filter is employed. However, a time-gated delay lock loop (DLL) will automatically synchronize its clock to that of the received signal and produce the same result.

Alternate Embodiments

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention.

For example, while various signals and signal processing techniques are discussed herein in analog form, digital implementations will be apparent to one skilled in the relevant art after reading this description.

For example, although one method for tracking the ATSC signal using the in-phase and quadrature channels is described, it should be clear that one can use only the in-phase channel, only the quadrature channel or any combination of the two to provide accurate tracking. Furthermore it should be clear that there are several methods of tracking these signals using various forms of conventional delay lock loops and through the use of various types of matched filters.

Implementations of the present invention exploit the low duty factor of the DTV signal in many ways. For example, one implementation employs a time-gated delay-lock loop (DLL) such as that disclosed in J. J. Spilker, Jr., Digital Communications by Satellite, Prentice-Hall, Englewood Cliffs N.J., 1977, Chapter 18–6. Other implementations employ variations of the DLL, including coherent, noncoherent, and quasi-coherent DLLs, such as those disclosed in J. J. Spilker, Jr., Digital Communications by Satellite, Prentice-Hall, Englewood Cliffs N.J., 1977, Chapter 18 and B. Parkinson and J. Spilker, Jr., Global Positioning System-Theory and Applications, AIAA, Washington, D.C., 1996, Vol. 1, Chapter 17, Fundamentals of Signal Tracking Theory by J. Spilker, Jr. Other implementations employ various types of matched filters, such as a recirculating matched filter.

In some implementations, DTV location server 110 employs redundant signals available at the system level, such as psuedoranges available from the DTV transmitters, making additional checks to validate each DTV channel and pseudo-range, and to identify DTV channels that are erroneous. One such technique is conventional receiver autonomous integrity monitoring (RAIM).

Accordingly, other embodiments are within the scope of the following claims.

What is claimed is:

1. A method for determining the position of a user terminal, comprising:

receiving at the user terminal a plurality of digital television (DTV) broadcast signals from a plurality of DTV transmitters;

determining a pseudo-range between the user terminal and each DTV transmitter based on the DTV broadcast signals; and determining a position of the user terminal based on the pseudo-ranges and a location of each of the DTV transmitters.

2. The method of claim 1, wherein determining a position of the user terminal comprises:

adjusting the pseudo-ranges based on a difference between a transmitter clock at one of the DTV transmitters and a known time reference; and determining the position of the user terminal based on the adjusted pseudo-ranges and the location of each of the DTV transmitters.

3. The method of claim 1, wherein the DTV broadcast signal is an American Television Standards Committee (ATSC) DTV signal, and the pseudo-ranges are determined based on a known digital sequence in the ATSC frame.

4. The method of claim 3, wherein the known digital sequence is a synchronization code.

5. The method of claim 4, wherein the synchronization code is a Field Synchronization Segment within an ATSC data frame.

6. The method of claim 4, wherein the synchronization code is a Synchronization Segment within a Data Segment within an ATSC data frame.

7. The method of claim 1, wherein determining a position of the user terminal comprises:

determining an offset between a local time reference in the user terminal and a master time reference; and determining the position of the user terminal based on the pseudo-ranges, the location of each of the DTV transmitters, and the offset.

8. The method of claim 7, further comprising:

determining a subsequent position of the user terminal using the offset.

9. The method of claim 1, wherein determining a pseudo-range comprises:

storing a portion of each of the DTV signals; and subsequently correlating each of the stored portions and a signal generated by the user terminal to produce the pseudo-ranges.

10. The method of claim 1, wherein determining a pseudo-range comprises:

correlating each of the DTV signals with a signal generated by the user terminal as the DTV signals are received to produce the pseudo-ranges.

11. The method of claim 1, wherein determining a position of the user terminal comprises:

determining a general geographic area within which the user terminal is located; and determining the position of the user terminal based on the pseudo-ranges and the general geographic area.

12. The method of claim 11, wherein the general geographic area is a footprint of an additional transmitter communicably linked to the user terminal.

13. The method of claim 1, wherein determining a position of the user terminal comprises:

determining a tropospheric propagation velocity in a vicinity of the user terminal;

adjusting the value of each pseudo-range based on the tropospheric propagation velocity; and determining the position of the user terminal based on the adjusted pseudo-ranges and the location of each of the DTV transmitters.

14. The method of claim 1, wherein determining a position of the user terminal comprises:

adjusting each pseudo-range based on a terrain elevation in a vicinity of the user terminal; and determining the position of the user terminal based on the adjusted pseudo-ranges and the location of each of the DTV transmitters.

15. The method of claim 1, further comprising:

selecting the DTV signals based on an identity of an additional transmitter communicably linked to the user terminal and a stored table correlating the additional transmitter and the received DTV broadcast signals.

16. The method of claim 1, further comprising:

accepting a location input from a user; and selecting the DTV signals based on the location input.

17. The method of claim 1, further comprising:

scanning available DTV signals to assemble a fingerprint of the location; and selecting the DTV broadcast signals used to determine the pseudo-ranges based on the fingerprint and a stored table that matches known fingerprints with known locations.

18. The method of claim 1, further comprising:

using receiver autonomous integrity monitoring (RAIM) to check the integrity of each pseudo-range based on redundant pseudo-ranges from the DTV transmitters.

19. A method for determining the position of a user terminal, comprising:

receiving at the user terminal a plurality of digital television (DTV) broadcast signals from a plurality of DTV transmitters;

determining a pseudo-range between the user terminal and each DTV transmitter based on the DTV broadcast signals; and transmitting the pseudo-ranges to a location server configured to determine a position of the user terminal based on the pseudo-ranges and a location of each of the DTV transmitters.

20. The method of claim 19, wherein determining a pseudo-range comprises:

determining a time of transmission from one of the DTV transmitters of a component of the DTV broadcast signal;

determining a time of reception at the user terminal of the component; and determining the difference between the time of transmission and the time of reception.

21. The method of claim 19, wherein the DTV broadcast signal is an American Television Standards Committee (ATSC) DTV signal, and the component is a known digital sequence in the ATSC frame.

22. The method of claim 21, wherein the component is a synchronization code.

23. The method of claim 22, wherein the synchronization code is a field synchronization segment within an ATSC data frame.

24. The method of claim 22, wherein the synchronization code is a synchronization segment within a data segment within an ATSC data frame.

25. The method of claim 19, wherein determining a pseudo-range comprises:
   storing a portion of each of the DTV signals; and
   subsequently correlating each of the stored portions and a signal generated by the user terminal to produce the pseudo-ranges.

26. The method of claim 19, wherein determining a pseudo-range comprises:
   correlating each of the DTV signals with a signal generated by the user terminal as the DTV signals are received to produce the pseudo-ranges.

27. A method for determining the position of a user terminal, comprising:
   receiving a plurality of pseudo-ranges from a user terminal, each pseudo-range determined between the user terminal and one of a plurality of DTV transmitters based on DTV signals broadcast by the DTV transmitters; and
   determining a position of the user terminal based on the pseudo-ranges and a location of each of the DTV transmitters.

28. The method of claim 27, wherein determining a position of the user terminal comprises:
   adjusting the pseudo-ranges based on a difference between a transmitter clock at one of the DTV transmitters and a known time reference; and
   determining the position of the user terminal based on the adjusted pseudo-ranges and the location of each of the DTV transmitters.

29. The method of claim 27, wherein the DTV broadcast signal is an American Television Standards Committee (ATSC) DTV signal, and the pseudo-ranges are determined based on a known digital sequence in the ATSC frame.

30. The method of claim 29, wherein the known digital sequence is a synchronization code.

31. The method of claim 30, wherein the synchronization code is a field synchronization segment within an ATSC data frame.

32. The method of claim 30, wherein the synchronization code is a synchronization segment within a data segment within an ATSC data frame.

33. The method of claim 27, wherein determining a position of the user terminal comprises:
   determining an offset between a local time reference in the user terminal and a master time reference; and
   determining the position of the user terminal based on the pseudo-ranges, the location of each of the DTV transmitters, and the offset.

34. The method of claim 33, further comprising:
   determining a subsequent position of the user terminal using the offset.

35. The method of claim 27, wherein determining a position of the user terminal comprises:
   determining a general geographic area within which the user terminal is located; and
   determining the position of the user terminal based on the pseudo-ranges and the general geographic area.

36. The method of claim 35, wherein the general geographic area is a footprint of an additional transmitter communicably linked to the user terminal.

37. The method of claim 27, wherein determining a position of the user terminal comprises:
   determining a tropospheric propagation velocity in a vicinity of the user terminal;
   adjusting the value of each pseudo-range based on the tropospheric propagation velocity; and
   determining the position of the user terminal based on the adjusted pseudo-ranges and the location of each of the DTV transmitters.

38. The method of claim 27, wherein determining a position of the user terminal comprises:
   adjusting each pseudo-range based on the terrain elevation in the vicinity of the user terminal; and
   determining the position of the user terminal based on the adjusted pseudo-ranges and the location of each of the DTV transmitters.

39. An apparatus for determining the position of a user terminal, comprising:
   means for receiving at the user terminal a plurality of digital television (DTV) broadcast signals from a plurality of DTV transmitters;
   means for determining a pseudo-range between the user terminal and each DTV transmitter based on the DTV broadcast signals; and
   means for determining a position of the user terminal based on the pseudo-ranges and a location of each of the DTV transmitters.

40. The apparatus of claim 39, wherein means for determining a position of the user terminal comprises:
   means for adjusting the pseudo-ranges based on a difference between a transmitter clock at one of the DTV transmitters and a known time reference; and
   means for determining the position of the user terminal based on the adjusted pseudo-ranges and the location of each of the DTV transmitters.

41. The apparatus of claim 39, wherein the DTV broadcast signal is an American Television Standards Committee (ATSC) DTV signal, and the pseudo-ranges are determined based on a known digital sequence in the ATSC frame.

42. The apparatus of claim 41, wherein the known digital sequence is a synchronization code.

43. The apparatus of claim 42, wherein the synchronization code is a Field Synchronization Segment within an ATSC data frame.

44. The apparatus of claim 42, wherein the synchronization code is a Synchronization Segment within a Data Segment within an ATSC data frame.

45. The apparatus of claim 39, wherein means for determining a position of the user terminal comprises:
   means for determining an offset between a local time reference in the user terminal and a master time reference; and
   means for determining the position of the user terminal based on the pseudo-ranges, the location of each of the DTV transmitters, and the offset.

46. The apparatus of claim 45, further comprising:
   means for determining a subsequent position of the user terminal using the offset.

47. The apparatus of claim 39, wherein means for determining a pseudo-range comprises:
   means for storing a portion of each of the DTV signals; and
   means for subsequently correlating each of the stored portions and a signal generated by the user terminal to produce the pseudo-ranges.

48. The apparatus of claim 39, wherein means for determining a pseudo-range comprises:
   means for correlating each of the DTV signals with a signal generated by the user terminal as the DTV signals are received to produce the pseudo-ranges.

49. The apparatus of claim 39, wherein means for determining a position of the user terminal comprises:

means for determining a general geographic area within which the user terminal is located; and means for determining the position of the user terminal based on the pseudo-ranges and the general geographic area.

50. The apparatus of claim 49, wherein the general geographic area is a footprint of an additional transmitter communicably linked to the user terminal.

51. The apparatus of claim 39, wherein means for determining a position of the user terminal comprises:

means for determining a tropospheric propagation velocity in the vicinity of the user terminal;

means for adjusting the value of each pseudo-range based on the tropospheric propagation velocity; and means for determining the position of the user terminal based on the adjusted pseudo-ranges and the location of each of the DTV transmitters.

52. The apparatus of claim 39, wherein means for determining a position of the user terminal comprises:

means for adjusting each pseudo-range based on a terrain elevation in a vicinity of the user terminal; and means for determining the position of the user terminal based on the adjusted pseudo-ranges and the location of each of the DTV transmitters.

53. The apparatus of claim 39, further comprising:

means for selecting the DTV signals based on an identity of an additional transmitter communicably linked to the user terminal and a stored table correlating the additional transmitter and the received DTV broadcast signals.

54. The apparatus of claim 39, further comprising:

means for accepting a location input from a user; and means for selecting the DTV signals based on the location input.

55. The apparatus of claim 39, further comprising:

means for scanning available DTV signals to assemble a fingerprint of the location; and means for selecting the DTV broadcast signals used to determine the pseudo-ranges based on the fingerprint and a stored table that matches known fingerprints with known locations.

56. The apparatus of claim 39, further comprising:

means for using receiver autonomous integrity monitoring (RAIM) to check the integrity of each pseudo-range based on redundant pseudo-ranges from the DTV transmitters.

57. An apparatus for determining the position of a user terminal, comprising:

means for receiving at the user terminal a plurality of digital television (DTV) broadcast signals from a plurality of DTV transmitters;

means for determining a pseudo-range between the user terminal and each DTV transmitter based on the DTV broadcast signals; and means for transmitting the pseudo-ranges to a location server configured to determine a position of the user terminal based on the pseudo-ranges and a location of each of the DTV transmitters.

58. The apparatus of claim 57, wherein means for determining a pseudo-range comprises:

means for determining a time of transmission from one of the DTV transmitters of a component of the DTV broadcast signal;

means for determining a time of reception at the user terminal of the component; and means for determining the difference between the time of transmission and the time of reception.

59. The apparatus of claim 57, wherein the DTV broadcast signal is an American Television Standards Committee (ATSC) DTV signal, and the component is a known digital sequence in the ATSC frame.

60. The apparatus of claim 59, wherein the component is a synchronization code.

61. The apparatus of claim 60, wherein the synchronization code is a field synchronization segment within an ATSC data frame.

62. The apparatus of claim 60, wherein the synchronization code is a synchronization segment within a data segment within an ATSC data frame.

63. The apparatus of claim 57, wherein means for determining a pseudo-range comprises:

means for storing a portion of each of the DTV signals; and means for subsequently correlating each of the stored portions and a signal generated by the user terminal to produce the pseudo-ranges.

64. The apparatus of claim 57, wherein means for determining a pseudo-range comprises:

means for correlating each of the DTV signals with a signal generated by the user terminal as the DTV signals are received to produce the pseudo-ranges.

65. An apparatus for determining the position of a user terminal, comprising:

means for receiving a plurality of pseudo-ranges from a user terminal, each pseudo-range determined between the user terminal and one of a plurality of DTV transmitters based on DTV signals broadcast by the DTV transmitters; and means for determining a position of the user terminal based on the pseudo-ranges and a location of each of the DTV transmitters.

66. The apparatus of claim 65, wherein means for determining a position of the user terminal comprises:

means for adjusting the pseudo-ranges based on a difference between a transmitter clock at one of the DTV transmitters and a known time reference; and means for determining the position of the user terminal based on the adjusted pseudo-ranges and the location of each of the DTV transmitters.

67. The apparatus of claim 65, wherein the DTV broadcast signal is an American Television Standards Committee (ATSC) DTV signal, and the pseudo-ranges are determined based on a known digital sequence in the ATSC frame.

68. The apparatus of claim 67, wherein the known digital sequence is a synchronization code.

69. The apparatus of claim 68, wherein the synchronization code is a field synchronization segment within an ATSC data frame.

70. The apparatus of claim 68, wherein the synchronization code is a synchronization segment within a data segment within an ATSC data frame.

71. The apparatus of claim 65, wherein means for determining a position of the user terminal comprises:

means for determining an offset between a local time reference in the user terminal and a master time reference; and means for determining the position of the user terminal based on the pseudo-ranges, the location of each of the DTV transmitters, and the offset.

72. The apparatus of claim 71, further comprising:

means for determining a subsequent position of the user terminal using the offset.

73. The apparatus of claim 65, wherein means for determining a position of the user terminal comprises:
  means for determining a general geographic area within which the user terminal is located; and
  means for determining the position of the user terminal based on the pseudo-ranges and the general geographic area.

74. The apparatus of claim 73, wherein the general geographic area is a footprint of an additional transmitter communicably linked to the user terminal.

75. The apparatus of claim 65, wherein means for determining a position of the user terminal comprises:
  means for determining a tropospheric propagation velocity in a vicinity of the user terminal;
  means for adjusting the value of each pseudo-range based on the tropospheric propagation velocity; and
  means for determining the position of the user terminal based on the adjusted pseudo-ranges and the location of each of the DTV transmitters.

76. The apparatus of claim 65, wherein means for determining a position of the user terminal comprises:
  means for adjusting each pseudo-range based on the terrain elevation in the vicinity of the user terminal; and
  means for determining the position of the user terminal based on the adjusted pseudo-ranges and the location of each of the DTV transmitters.

77. A computer program product, tangibly stored on a computer-readable medium, for determining the position of a user terminal, comprising instructions operable to cause a programmable processor to:
  receive at the user terminal a plurality of digital television (DTV) broadcast signals from a plurality of DTV transmitters;
  determine a pseudo-range between the user terminal and each DTV transmitter based on the DTV broadcast signals; and
  determine a position of the user terminal based on the pseudo-ranges and a location of each of the DTV transmitters.

78. The computer program product of claim 77, wherein instructions operable to cause a programmable processor to determine a position of the user terminal comprise instructions operable to cause a programmable processor to:
  adjust the pseudo-ranges based on a difference between a transmitter clock at one of the DTV transmitters and a known time reference; and
  determine the position of the user terminal based on the adjusted pseudo-ranges and the location of each of the DTV transmitters.

79. The computer program product of claim 77, wherein the DTV broadcast signal is an American Television Standards Committee (ATSC) DTV signal, and the pseudo-ranges are determined based on a known digital sequence in the ATSC frame.

80. The computer program product of claim 79, wherein the known digital sequence is a synchronization code.

81. The computer program product of claim 80, wherein the synchronization code is a Field Synchronization Segment within an ATSC data frame.

82. The computer program product of claim 80, wherein the synchronization code is a Synchronization Segment within a Data Segment within an ATSC data frame.

83. The computer program product of claim 77, wherein instructions operable to cause a programmable processor to determine a position of the user terminal comprise instructions operable to cause a programmable processor to:
  determine an offset between a local time reference in the user terminal and a master time reference; and
  determine the position of the user terminal based on the pseudo-ranges, the location of each of the DTV transmitters, and the offset.

84. The computer program product of claim 83, further comprising instructions operable to cause a programmable processor to:
  determine a subsequent position of the user terminal using the offset.

85. The computer program product of claim 77, wherein instructions operable to cause a programmable processor to determine a pseudo-range comprise instructions operable to cause a programmable processor to:
  store a portion of each of the DTV signals; and
  subsequently correlate each of the stored portions and a signal generated by the user terminal to produce the pseudo-ranges.

86. The computer program product of claim 77, wherein instructions operable to cause a programmable processor to determine a pseudo-range comprise instructions operable to cause a programmable processor to:
  correlate each of the DTV signals with a signal generated by the user terminal as the DTV signals are received to produce the pseudo-ranges.

87. The computer program product of claim 77, wherein instructions operable to cause a programmable processor to determine a position of the user terminal comprise instructions operable to cause a programmable processor to:
  determine a general geographic area within which the user terminal is located; and
  determine the position of the user terminal based on the pseudo-ranges and the general geographic area.

88. The computer program product of claim 87, wherein the general geographic area is a footprint of an additional transmitter communicably linked to the user terminal.

89. The computer program product of claim 77, wherein instructions operable to cause a programmable processor to determine a position of the user terminal comprise instructions operable to cause a programmable processor to
  determine a tropospheric propagation velocity in a vicinity of the user terminal;
  adjust the value of each pseudo-range based on the tropospheric propagation velocity; and
  determine the position of the user terminal based on the adjusted pseudo-ranges and the location of each of the DTV transmitters.

90. The computer program product of claim 77, wherein instructions operable to cause a programmable processor to determine a position of the user terminal comprise instructions operable to cause a programmable processor to:
  adjust each pseudo-range based on the terrain elevation in the vicinity of the user terminal; and
  determine the position of the user terminal based on the adjusted pseudo-ranges and the location of each of the DTV transmitters.

91. The computer program product of claim 77, further comprising instructions operable to cause a programmable processor to:
  select the DTV signals based on an identity of an additional transmitter communicably linked to the user terminal and a stored table correlating the additional transmitter and the received DTV broadcast signals.

92. The computer program product of claim 77, further comprising instructions operable to cause a programmable processor to:

accept a location input from a user; and select the DTV signals based on the location input.

93. The computer program product of claim 77, further comprising instructions operable to cause a programmable processor to:

scan available DTV signals to assemble a fingerprint of the location; and select the DTV broadcast signals used to determine the pseudo-ranges based on the fingerprint and a stored table that matches known fingerprints with known locations.

94. The computer program product of claim 77, further comprising instructions operable to cause a programmable processor to:

use receiver autonomous integrity monitoring (RAIM) to check the integrity of each pseudo-range based on redundant pseudo-ranges from the DTV transmitters.

95. A computer program product, tangibly stored on a computer-readable medium, for determining the position of a user terminal, comprising instructions operable to cause a programmable processor to:

receive at the user terminal a plurality of digital television (DTV) broadcast signals from a plurality of DTV transmitters;

determine a pseudo-range between the user terminal and each DTV transmitter based on the DTV broadcast signals; and transmit the pseudo-ranges to a location server configured to determine a position of the user terminal based on the pseudo-ranges and a location of each of the DTV transmitters.

96. The computer program product of claim 95, wherein instructions operable to cause a programmable processor to determine a pseudo-range comprise instructions operable to cause a programmable processor to:

determine a time of transmission from one of the DTV transmitters of a component of the DTV broadcast signal;

determine a time of reception at the user terminal of the component; and determining the difference between the time of transmission and the time of reception.

97. The computer program product of claim 95, wherein the DTV broadcast signal is an American Television Standards Committee (ATSC) DTV signal, and the component is a known digital sequence in the ATSC frame.

98. The computer program product of claim 97, wherein the component is a synchronization code.

99. The computer program product of claim 98, wherein the synchronization code is a field synchronization segment within an ATSC data frame.

100. The computer program product of claim 98, wherein the synchronization code is a synchronization segment within a data segment within an ATSC data frame.

101. The computer program product of claim 95, wherein instructions operable to cause a programmable processor to determine a pseudo-range comprise instructions operable to cause a programmable processor to:

store a portion of each of the DTV signals; and subsequently correlate each of the stored portions and a signal generated by the user terminal to produce the pseudo-ranges.

102. The computer program product of claim 95, wherein instructions operable to cause a programmable processor to determine a pseudo-range comprise instructions operable to cause a programmable processor to:

correlate each of the DTV signals with a signal generated by the user terminal as the DTV signals are received to produce the pseudo-ranges.

103. A computer program product, tangibly stored on a computer-readable medium, for determining the position of a user terminal, comprising instructions operable to cause a programmable processor to:

receive a plurality of pseudo-ranges from a user terminal, each pseudo-range determined between the user terminal and one of a plurality of DTV transmitters based on DTV signals broadcast by the DTV transmitters; and determine a position of the user terminal based on the pseudo-ranges and a location of each of the DTV transmitters.

104. The computer program product of claim 103, wherein instructions operable to cause a programmable processor to determine a position of the user terminal comprise instructions operable to cause a programmable processor to:

adjust the pseudo-ranges based on a difference between a transmitter clock at one of the DTV transmitters and a known time reference; and determine the position of the user terminal based on the adjusted pseudo-ranges and the location of each of the DTV transmitters.

105. The computer program product of claim 103, wherein the DTV broadcast signal is an American Television Standards Committee (ATSC) DTV signal, and the pseudo-ranges are determined based on a known digital sequence in the ATSC frame.

106. The computer program product of claim 105, wherein the known digital sequence is a synchronization code.

107. The computer program product of claim 106, wherein the synchronization code is a field synchronization segment within an ATSC data frame.

108. The computer program product of claim 106, wherein the synchronization code is a synchronization segment within a data segment within an ATSC data frame.

109. The computer program product of claim 103, wherein instructions operable to cause a programmable processor to determine a position of the user terminal comprise instructions operable to cause a programmable processor to:

determine an offset between a local time reference in the user terminal and a master time reference; and determine the position of the user terminal based on the pseudo-ranges, the location of each of the DTV transmitters, and the offset.

110. The computer program product of claim 109, further comprising instructions operable to cause a programmable processor to:

determine a subsequent position of the user terminal using the offset.

111. The computer program product of claim 103, wherein instructions operable to cause a programmable processor to determine a position of the user terminal comprise instructions operable to cause a programmable processor to:

determine a general geographic area within which the user terminal is located; and determine the position of the user terminal based on the pseudo-ranges and the general geographic area.

112. The computer program product of claim 111, wherein the general geographic area is a footprint of an additional transmitter communicably linked to the user terminal.

113. The computer program product of claim 103, wherein instructions operable to cause a programmable processor to determine a position of the user terminal comprise instructions operable to cause a programmable processor to:

determine a tropospheric propagation velocity in the vicinity of the user terminal;

adjust the value of each pseudo-range based on the tropospheric propagation velocity; and determine the position of the user terminal based on the adjusted pseudo-ranges and the location of each of the DTV transmitters.

114. The computer program product of claim 103, wherein instructions operable to cause a programmable processor to determine a position of the user terminal comprise instructions operable to cause a programmable processor to:

adjust each pseudo-range based on the terrain elevation in the vicinity of the user terminal; and determine the position of the user terminal based on the adjusted pseudo-ranges and the location of each of the DTV transmitters.

\* \* \* \* \*